United States Patent [19]

Tachikawa et al.

[11] Patent Number: 5,652,803
[45] Date of Patent: Jul. 29, 1997

[54] SPECIAL-DOCUMENT DISCRIMINATING APPARATUS AND MANAGING SYSTEM FOR IMAGE FORMING APPARATUS HAVING A SPECIAL-DOCUMENT DISCRIMINATING FUNCTION

[75] Inventors: Michiyoshi Tachikawa, Yokohama; Shigeo Kurotaka, Sagamihara; Takeshi Ukai, Yokohama; Yukio Sakano, Fuchu; Kouji Ishigaki; Hiromi Okubo, both of Yokohama; Kyoji Omi, Kawasaki; Toshiya Hikita, Machida; Yoshio Kaneko, Tokyo; Takashi Saitoh, Yokohama, all of Japan

[73] Assignee: Ricoh Company, Ltd., Tokyo, Japan

[21] Appl. No.: 601,837

[22] Filed: Feb. 15, 1996

Related U.S. Application Data

[63] Continuation of Ser. No. 211,433, filed as PCT/JP93/01069, Jul. 29, 1993 published as WO94/03998, Feb. 17, 1994, abandoned.

[30] Foreign Application Priority Data

Aug. 10, 1992 [JP] Japan ................................. 4-234196
Aug. 12, 1992 [JP] Japan ................................. 4-236515

[51] Int. Cl.$^6$ ......................................... G06K 9/00
[52] U.S. Cl. ..................... 382/135; 382/181; 399/8; 399/9
[58] Field of Search .................... 382/135, 137, 382/165, 181, 155, 159, 218, 191; 358/401, 444; 355/201, 133

[56] References Cited

U.S. PATENT DOCUMENTS 5,363,202  11/1994  Udagawa et al. ................ 358/501

FOREIGN PATENT DOCUMENTS 0 366 399  5/1990  European Pat. Off. .
2-83571    3/1990  Japan .
2-210591   8/1990  Japan .
4-70676    3/1992  Japan .

*Primary Examiner*—Leo Boudreau
*Assistant Examiner*—Phuoc Tran
*Attorney, Agent, or Firm*—Oblon, Spivak, McClelland, Maier & Neustadt, P.C.

[57] ABSTRACT

The present invention relates to a special-document discriminating apparatus used for providing a counterfeit preventing function to a digital copy machine and the like, and to a managing system for an image forming apparatus having a special-document discriminating function. The special-document discriminating apparatus is provided with a ROM for discriminating a special-document such as paper money, which ROM is detachably attached to a controlling circuit board. Data used for determination may be learned from test pattern data input from the image forming apparatus, or the data may be input from an external unit via a communication line. The managing system for an image forming apparatus comprises an image forming apparatus and a managing apparatus connected to the image forming apparatus. Either the image forming apparatus or the managing apparatus has a special-document discriminating function. Additional information is sent from the image forming apparatus together with determination result information or detected data. Information used as reference for determination may be sent from the managing apparatus to the image forming apparatus.

5 Claims, 37 Drawing Sheets

PAPER MONEY SIGNAL OR NON-PAPER-MONEY SIGNAL

PAPER MONEY SIGNAL OR NON-PAPER-MONEY SIGNAL

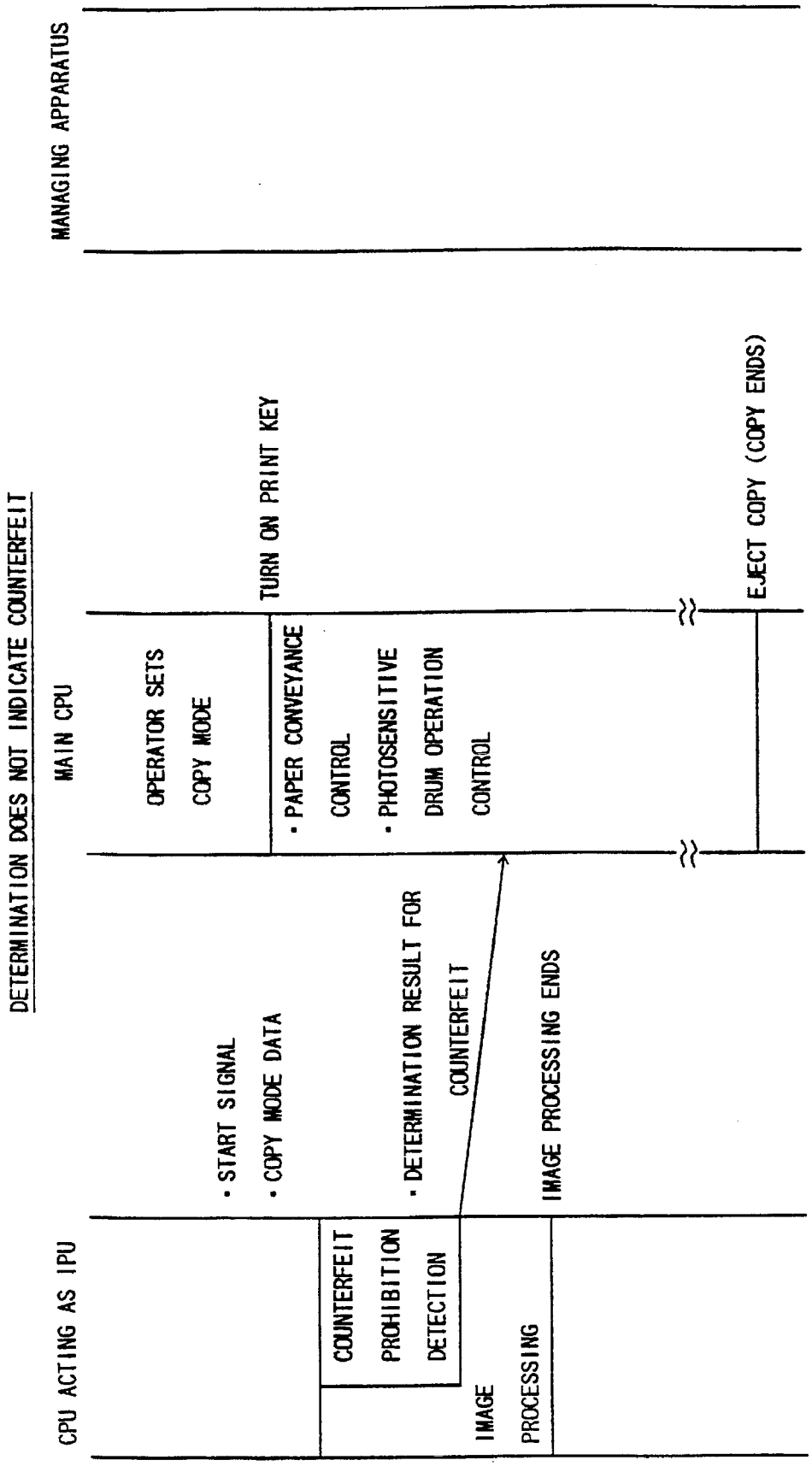

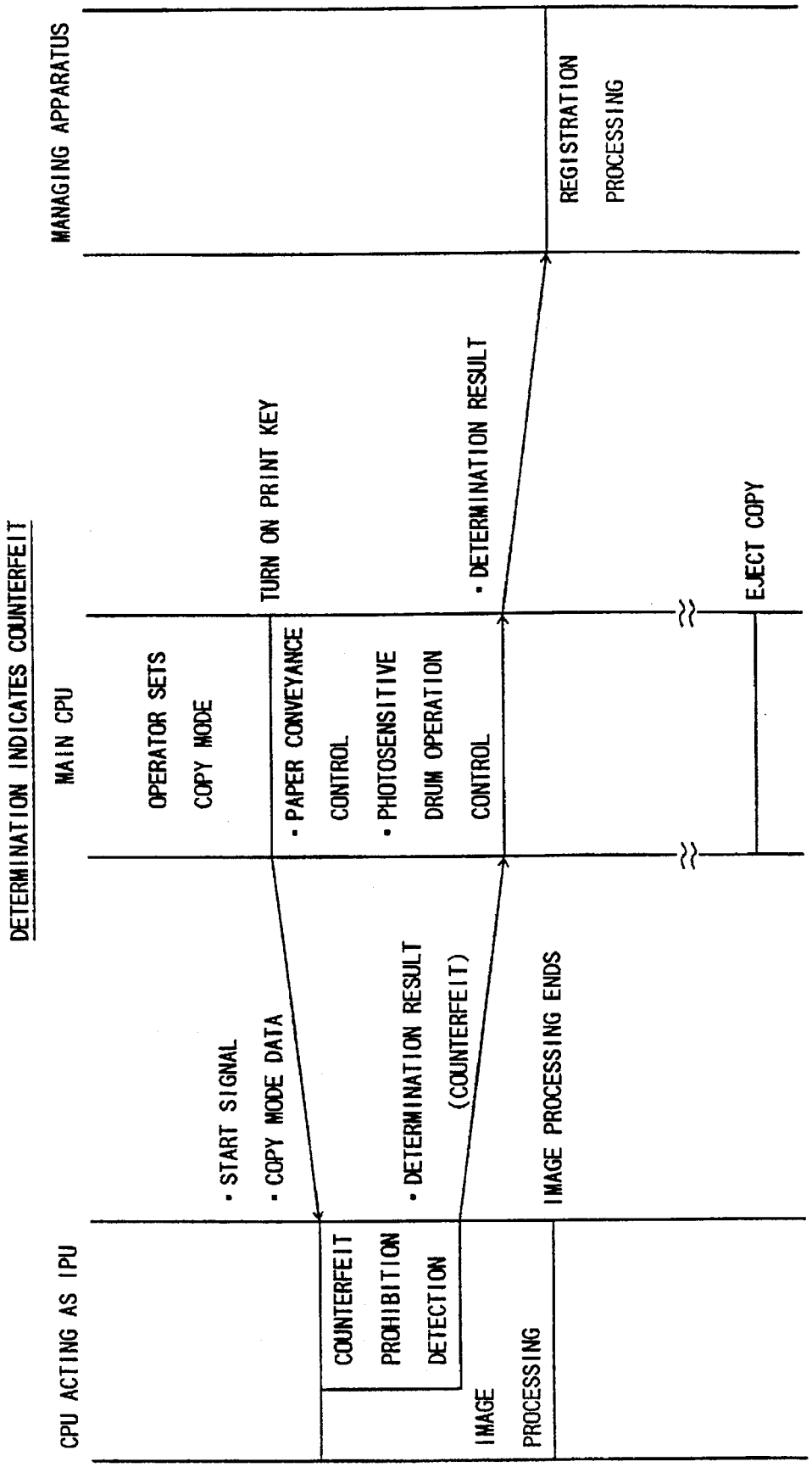

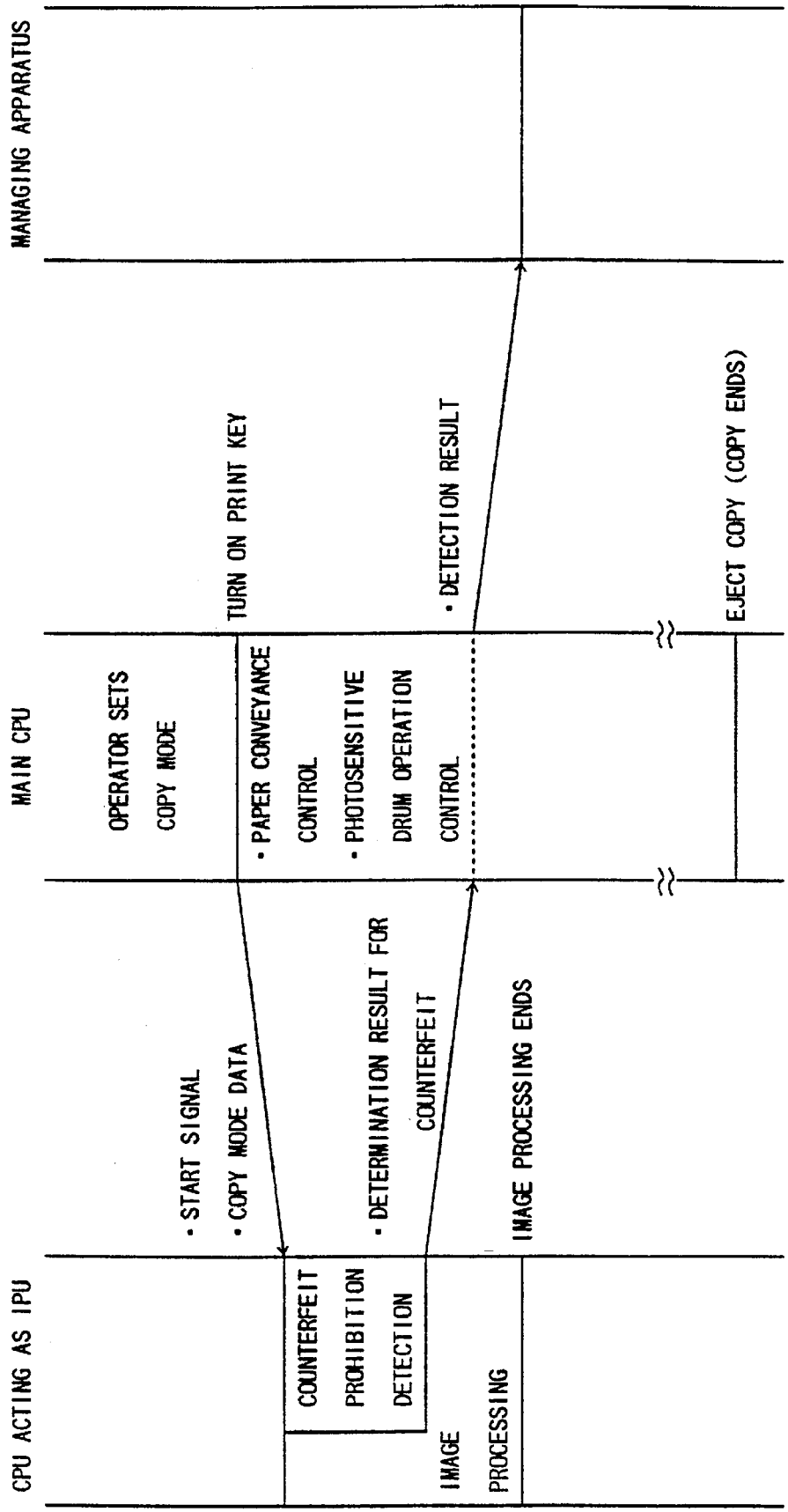

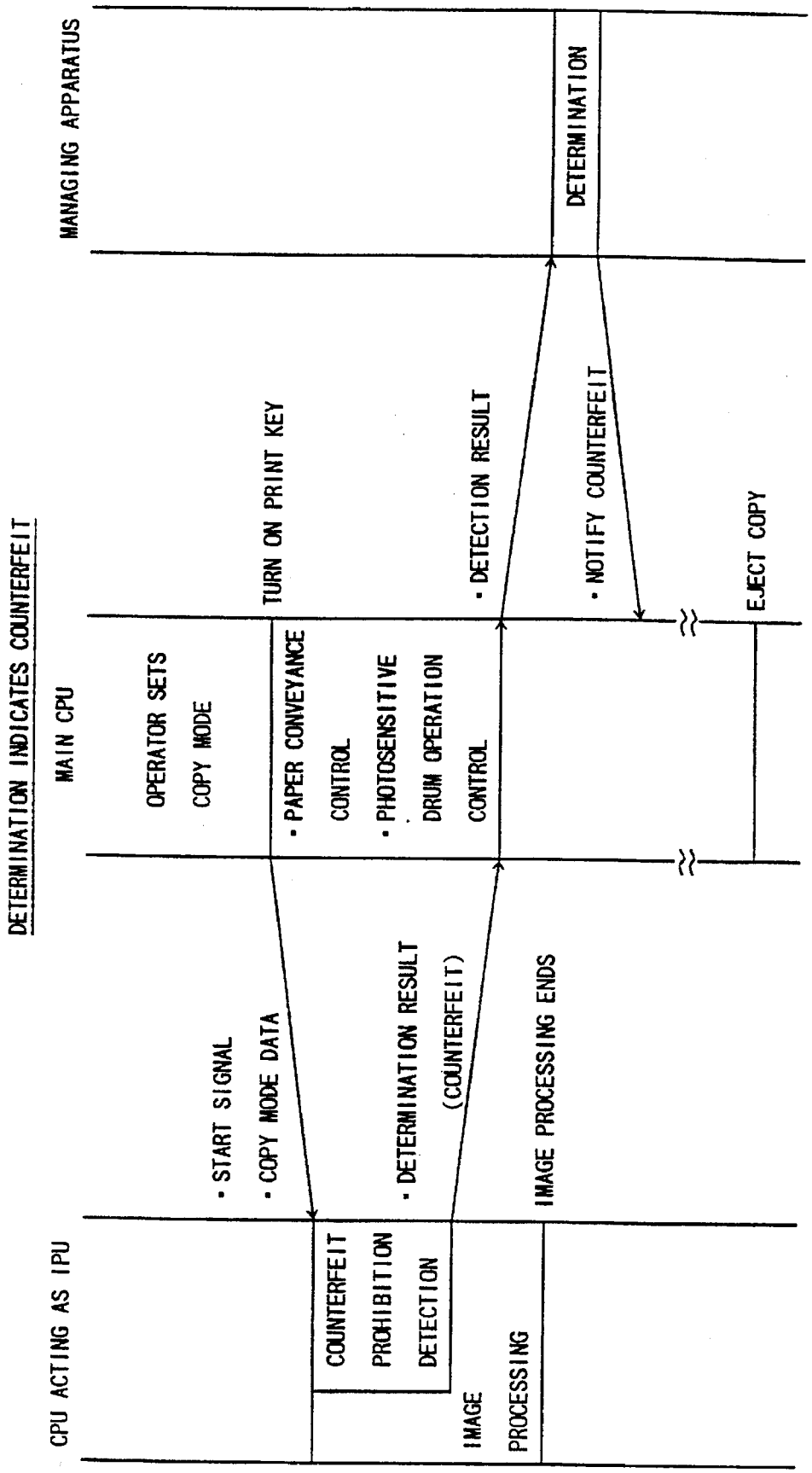

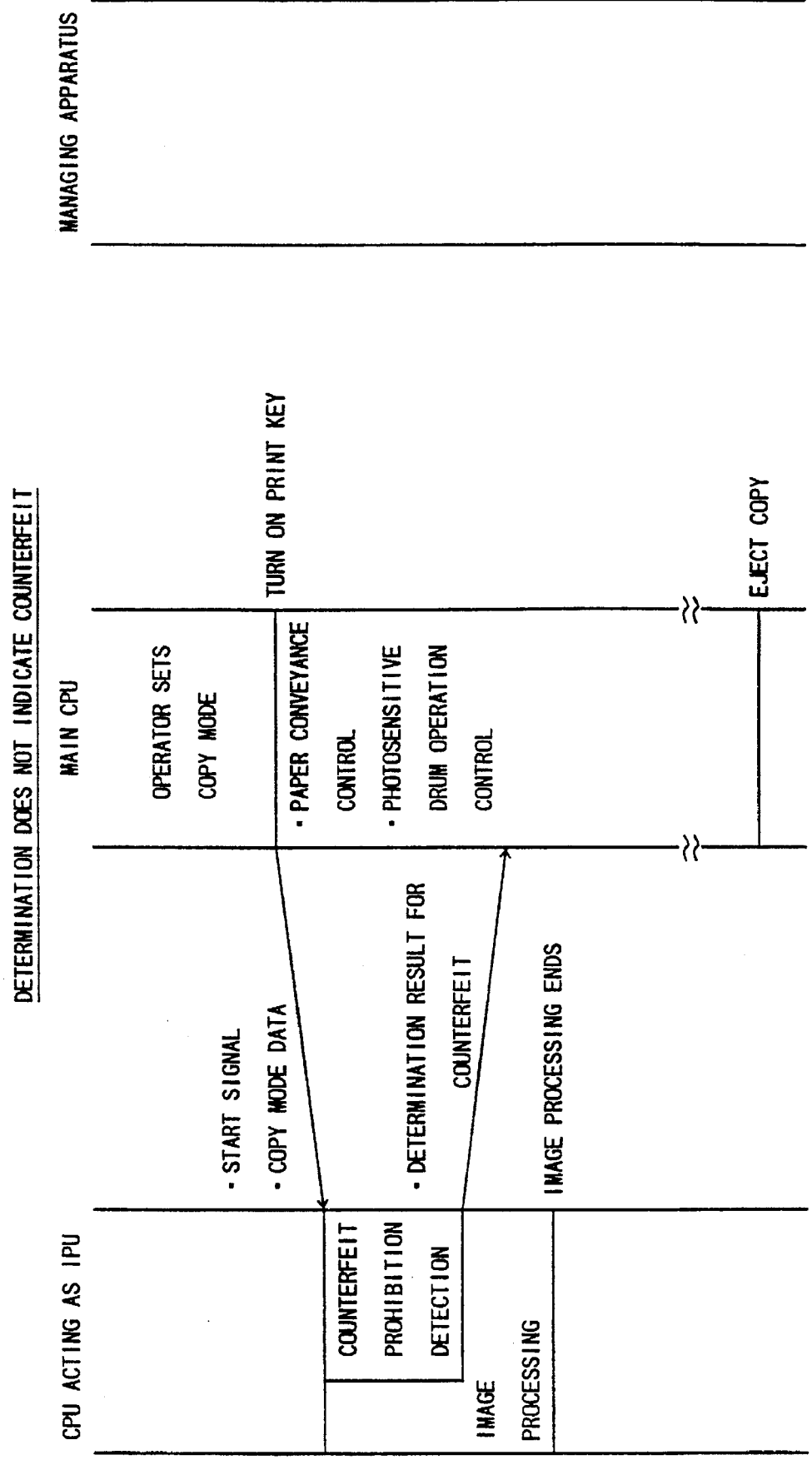

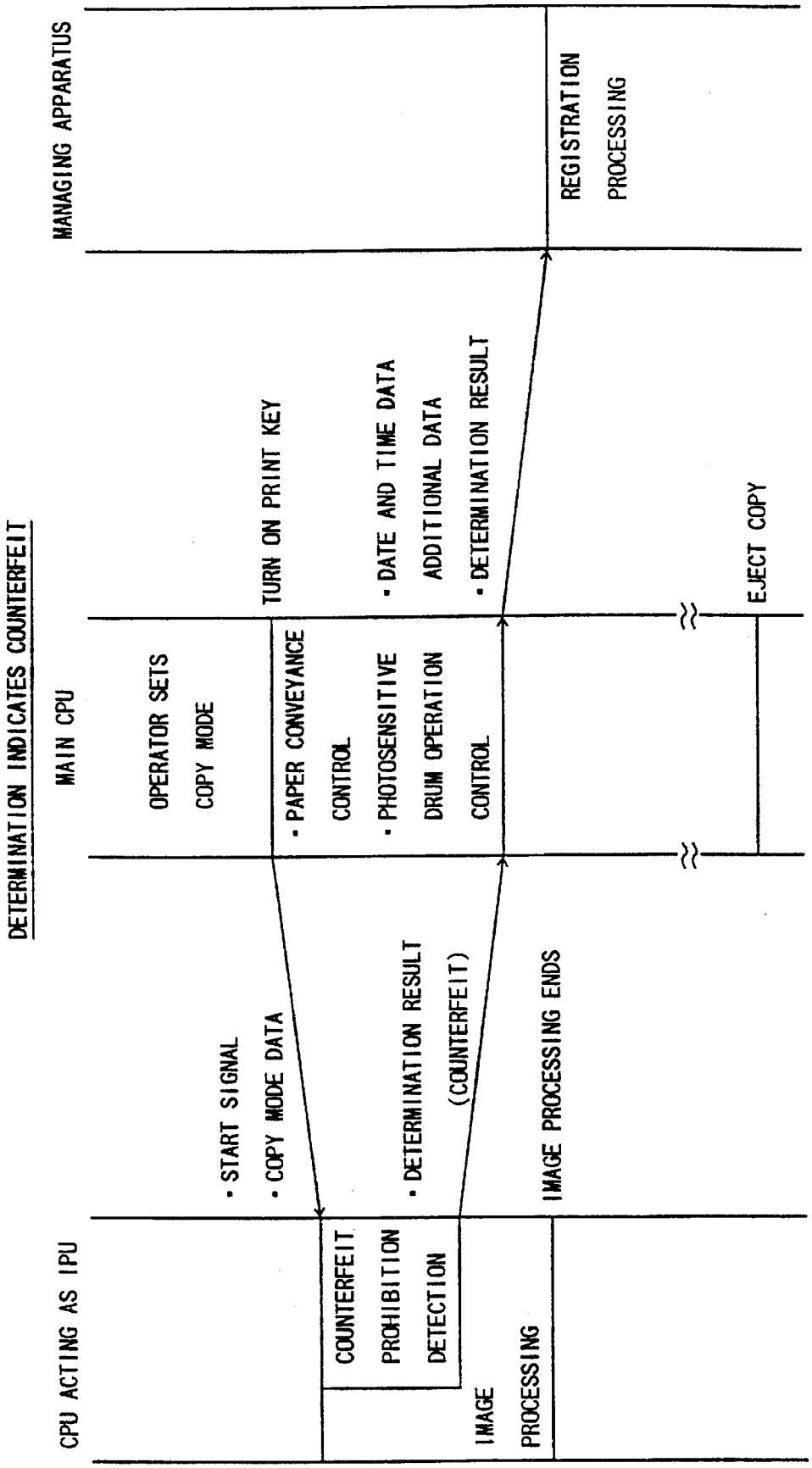

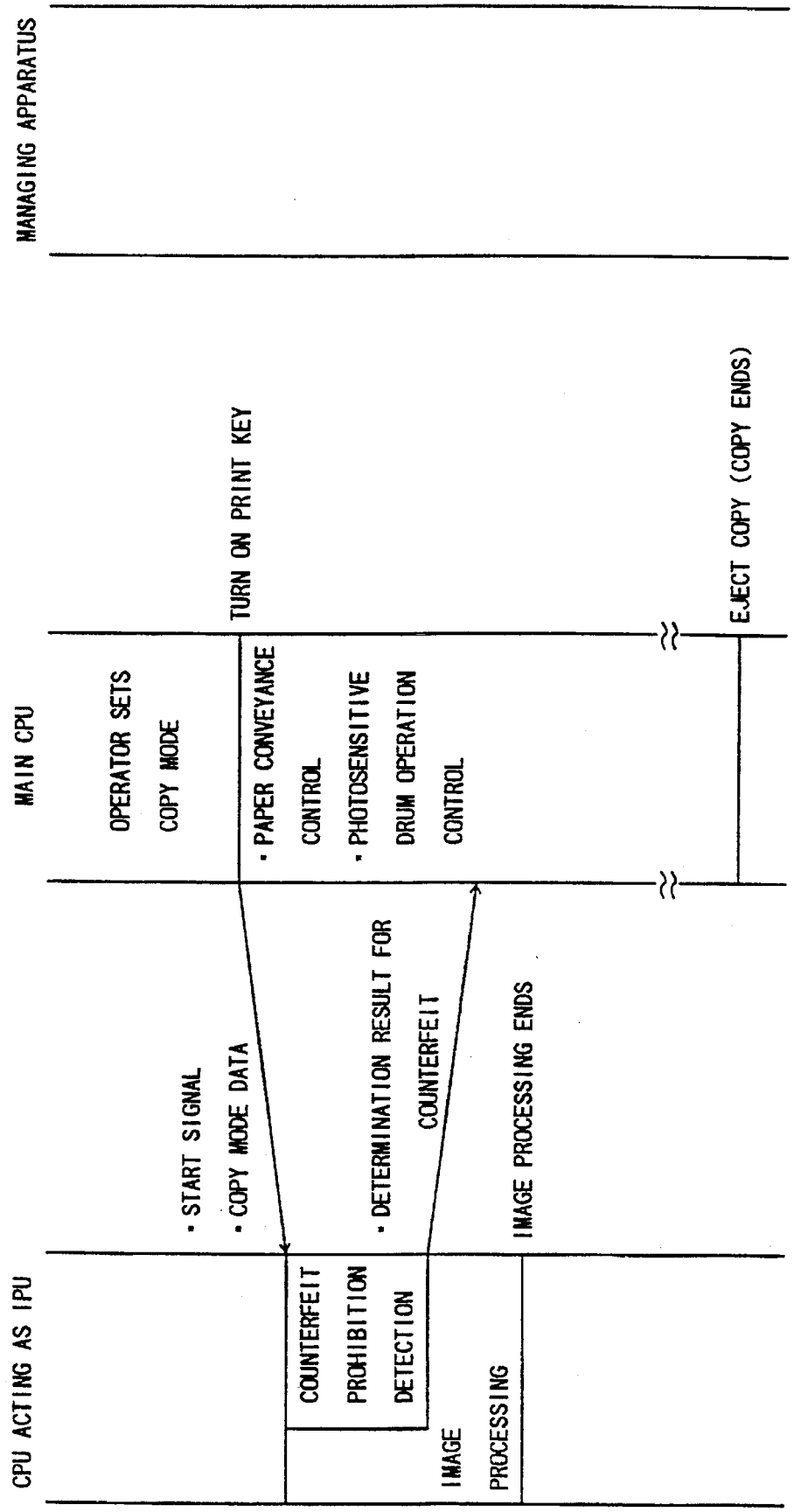

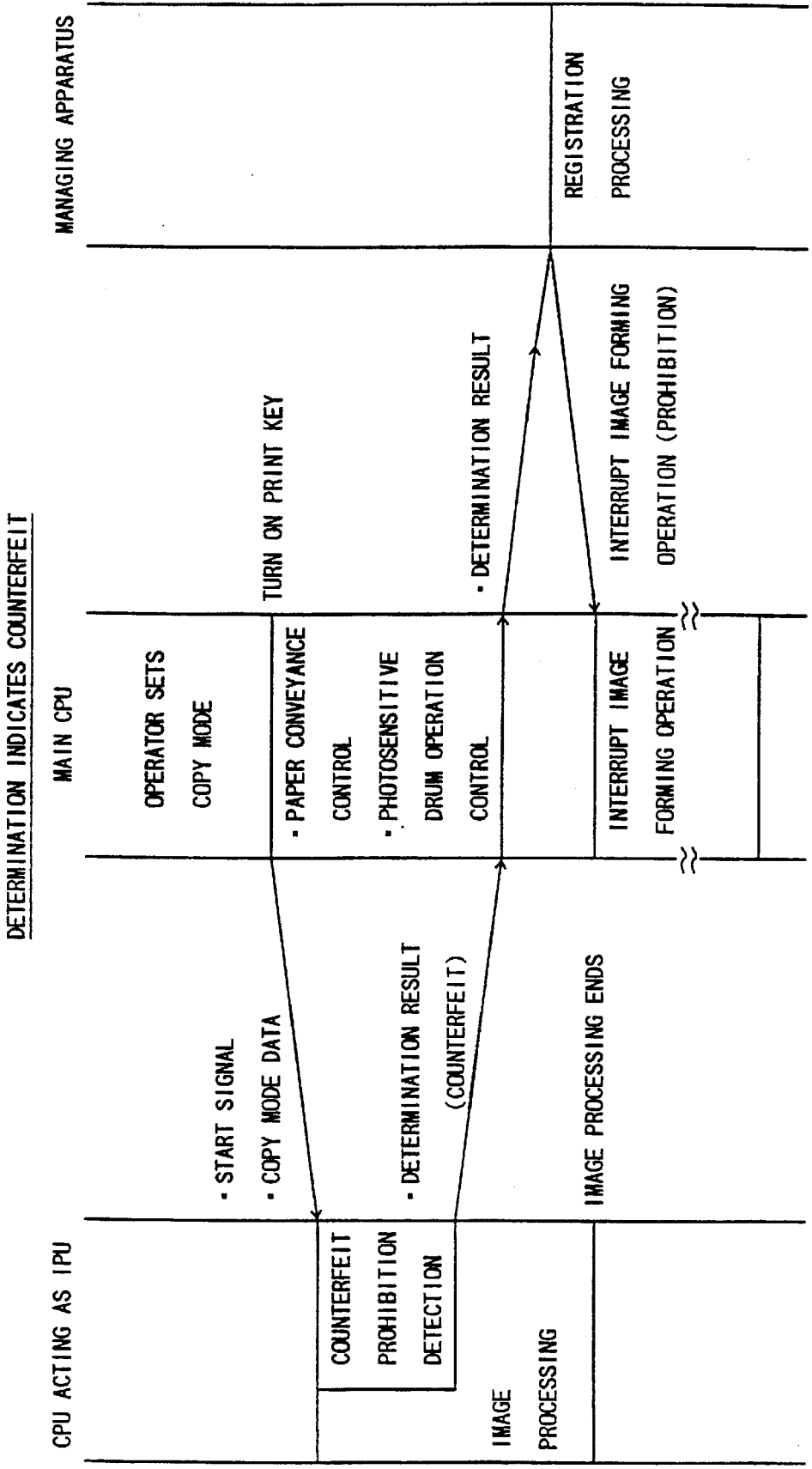

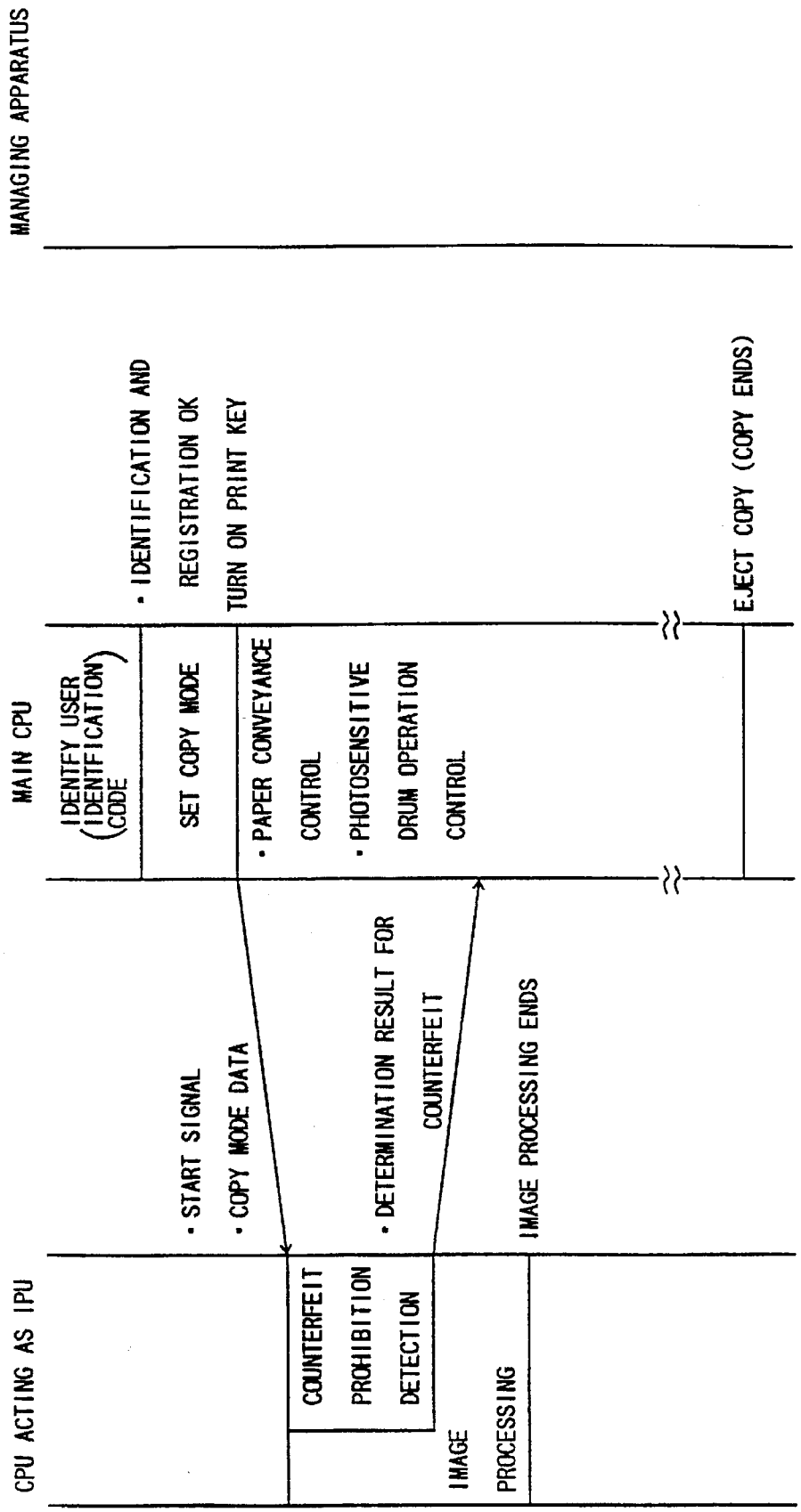

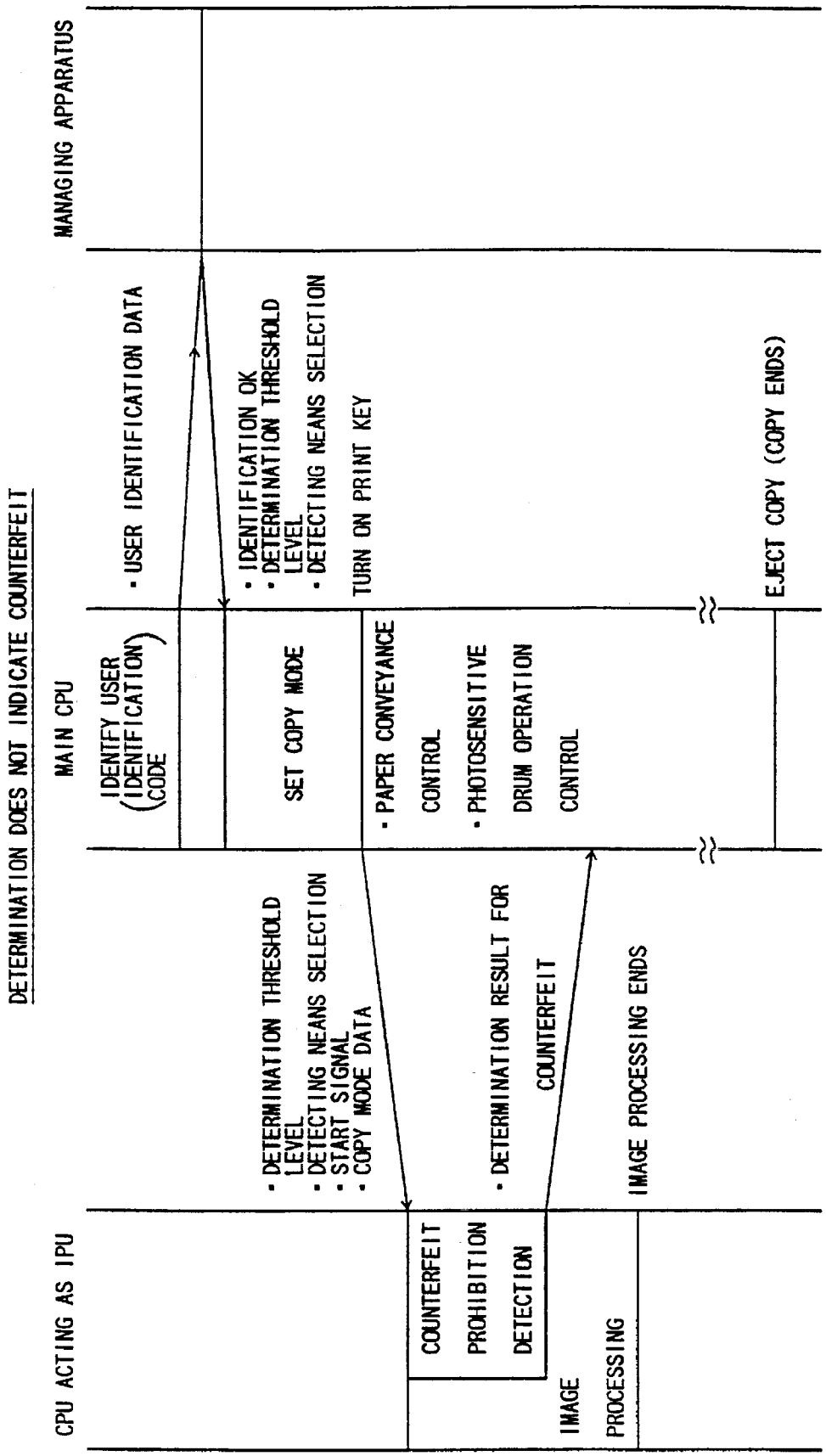

SPECIAL-DOCUMENT DISCRIMINATING APPARATUS AND MANAGING SYSTEM FOR IMAGE FORMING APPARATUS HAVING A SPECIAL-DOCUMENT DISCRIMINATING FUNCTION

This application is a continuation of application Ser. No. 08/211,433, filed on Apr. 11, 1994, now abandoned, which was filed as PCT application PCT/JP93/01069 on Jul. 29, 1993.

BACKGROUND OF THE INVENTION

1. Field of the Invention

The present invention relates to a special-document discriminating apparatus used for providing a counterfeit preventing function to a digital copy machine and the like, and to a managing system for an image forming apparatus having a special-document discriminating function.

2. Background of the Related Art

In recent years, color copy machines have been generally used. In the color copying technology, the image processing technique has been highly developed, and thus a precise copy, which cannot be distinguished from the original, can be obtained even for paper money having a complex design. To this end, in order to prevent counterfeiting, an apparatus which discriminates a special document such as a bill of paper money and prohibits copying when an original is determined to be the special document has been developed.

A special-document discriminating apparatus is described, for example, in Japanese Laid-Open Patent Application No. 2-83571. The apparatus described in the literature is adapted to discriminate a special-document using the pattern matching method. That is, a pattern of an image input to the apparatus is compared with preregistered pattern data in the apparatus, and it is determined whether or not the input image pattern corresponds to the registered pattern. The preregistered pattern is a pattern of a document (such as a sheet of paper money) of which duplication is prohibited.

Additionally, another apparatus is described in Japanese Laid-Open Patent Application No. 2-210591, which apparatus performs a discrimination similarly to the above mentioned apparatus. In this apparatus, an approximate position of a document (in this case, a sheet of paper money) is determined first by detecting a watermark of the document (paper money). The exact position and the angle of the paper money is then determined by detecting the four corners of the paper money sheet. Thereafter, the degree of resemblance is obtained by means of pattern matching in accordance with image data of the paper money and the registered pattern data, and thus it is determined whether or not the document is a predetermined document of which duplication is prohibited.

In the above-mentioned conventional apparatuses, when new paper money is issued, new pattern data corresponding to the newly issued paper money must be added to the registered paper money pattern data. In order to achieve this, it is required to replace the paper money discriminating apparatus itself or the controlling circuit board of the paper money discriminating apparatus is replaced with a new one. That is, when new paper money is issued, a maintenance person must make a visit to the site where the copy machine is installed so as to replace the paper money discriminating apparatus or the controlling circuit board thereof. This replacing work requires a large amount of labor and man-hours. Accordingly, there is a problem in that when new paper money is issued, a high maintenance cost is created for maintaining paper money discrimination apparatuses.

Additionally, since the above-mentioned conventional image forming apparatuses are in standalone form, only the act of duplication is prevented when a duplication of a paper money and the like is attempted, and thus the level has not been reached where a counterfeit is prevented beforehand or tracing of a counterfeit product can be performed by managing counterfeit information.

SUMMARY OF THE INVENTION

It is a general object of the present invention to provide a novel and useful special-document discriminating apparatus and managing system for an image forming apparatus having a special-document discriminating function.

A more specific object of the present invention is to provide a special-document discriminating apparatus in which discrimination information can be easily added.

Another object of the present invention is to provide a managing system which can effectively prevent counterfeiting performed by duplicating a special document by remotely managing image forming apparatuses by utilizing a communication line.

In order to achieve the above-mentioned objects, according to the present invention there is provided a special-document discriminating apparatus, connected to an image forming apparatus, which determines whether or not image data input from the image forming apparatus corresponds to a predetermined special-document, the special-document discriminating apparatus comprising:

storing means, detachably attached to a controlling circuit board, for storing discriminating information used for determining whether or not the input image data corresponds to a special-document;

determining means for determining whether or not the input image data corresponds to the special-document in accordance with the discriminating information supplied by the storing means, and outputting the result of the determination to an external unit; and operation prohibiting means for outputting a signal used for prohibiting the operation of the image forming apparatus when the storing means is not attached to the controlling circuit board, wherein the storing means is replaced with another one so that the discriminating information is changed.

According to the above-mentioned configuration, since discrimination information of a new special-document can be added or changed by merely replacing the storing means, there is no need to replace the whole of the controlling circuit board.

There is provided a special-document discriminating apparatus, connected to an image forming apparatus, which determines whether or not image data input from the image forming apparatus corresponds to a predetermined special-document, the special-document discriminating apparatus comprising:

storing means, detachably attached to a controlling circuit board, for storing discrimination information used for determining whether or not the input image data corresponds to a special-document;

determining means for determining whether or not the input image data corresponds to the special-document in accordance with the discrimination information supplied by the storing means, and outputting the result of the determination to an external unit; and new paper money learning means for extracting the discrimination information of the special-document, when a predetermined signal is input, from the image data input from the image forming apparatus, and inputting the discrimination information to the storing means.

According to the above-mentioned configuration, the data used for the determination can be input to the storing means from the image forming apparatus, and thus there is no need to replace any parts when changing the discrimination information. A test pattern having features of the special-document may be used for inputting the data for the determination.

There is provided a special-document discriminating apparatus, connected to an image forming apparatus, which determines whether or not image data input from the image forming apparatus corresponds to a predetermined special-document, the special-document discriminating apparatus comprising:

storing means, detachably attached to a controlling circuit board, for storing discrimination information used for determining whether or not the input image data corresponds to a special-document;

determining means for determining whether or not the input image data corresponds to the special-document in accordance with the discrimination information supplied by the storing means, and outputting the result of the determination to an external unit; and communication controlling means for receiving the discrimination information from an external unit via a communication line, and outputting the discrimination information to the storing means.

According to the above-mentioned configuration, the discrimination information can be input from an external unit to the storing means via the communication controlling means, and thus time and labor spent on changing the discrimination information can be reduced.

There is provided a managing system for an image forming apparatus comprising an image forming apparatus and a managing apparatus placed at a position remote from the image forming apparatus and connected with the image forming apparatus via a communication line, the image forming apparatus comprising:

detecting means for detecting features of a predetermined special-document from image data of an original;

determining means for determining whether or not the original corresponds to the predetermined special-document in accordance with the detection result obtained by the detecting means; and sending means for sending, when the original is determined to correspond to the predetermined special-document by the determining means, determination result information to an external unit.

According to the above-mentioned configuration, unlawful acts such as duplication of a special-document performed at a plurality of image forming apparatuses can be monitored by the remotely placed managing apparatus. The determination result information may include additional information including at least one of date and time of image forming, serial number, image forming operation mode and history of image forming operation within a predetermined period, so that an efficient management can be performed. Additionally, the managing apparatus may comprise means for sending to the image forming apparatus an operation prohibiting signal for prohibiting operation of the image forming apparatus in accordance with the determination result information, and a cancellation signal for canceling the prohibition of the operation.

There is provided a managing system for an image forming apparatus comprising an image forming apparatus and a managing apparatus placed at a position remote from the image forming apparatus and connected with the image forming apparatus via a communication line, wherein the managing apparatus comprises discriminating means for discriminating a predetermined special-document; and the image forming apparatus comprises detecting means for detecting features of a predetermined special-document from image data of an original; and wherein the detection result obtained by the detecting means is sent to the managing apparatus; the discriminating means determines whether or not the original corresponds to the predetermined special-document in accordance with the detection result; and the determination result is sent to the image forming apparatus.

According to the above-mentioned configuration, since the discriminating means is provided to the managing apparatus, there is no need to provide the discriminating means to each image forming apparatus, and thus the manufacturing cost is reduced. Additionally, the managing apparatus may comprise means for sending to the image forming apparatus an operation prohibiting signal for prohibiting operation of the image forming apparatus in accordance with the determination result information, and a cancellation signal for canceling the prohibition of the operation.

There is provided a managing system for an image forming apparatus comprising an image forming apparatus and a managing apparatus placed at a position remote from the image forming apparatus and connected with the image forming apparatus via a communication line, the image forming apparatus comprising:

detecting means for detecting features of a predetermined special-document from image data of an original;

determining means for determining whether or not the original corresponds to the predetermined special-document in accordance with a comparison performed on the detection result obtained by the detecting means and a predetermined threshold level value; and sending means for sending, when the original is determined to correspond to the predetermined special-document by the determining means, determination result information to an external unit, wherein the managing apparatus comprises means for sending a signal used for changing the threshold level value to the image forming apparatus.

According to the above-mentioned configuration, discrimination of the special-document is performed in accordance with the predetermined threshold value, and the level of the determination can be determined by the threshold value. The managing apparatus may comprise means for sending to the image forming apparatus an operation prohibiting signal for prohibiting operation of the image forming apparatus in accordance with the determination result information, and a cancellation signal for canceling the prohibition of the operation.

There is provided a managing system for an image forming apparatus comprising an image forming apparatus and a managing apparatus placed at a position remote from the image forming apparatus and connected with the image forming apparatus via a communication line, wherein the image forming apparatus comprises:

detecting means for detecting features of a predetermined special-document from image data of an original;

determining means for determining whether or not the original corresponds to the predetermined special-document in accordance with a comparison performed on the detection result obtained by detecting means and a predetermined threshold level value;

means for inputting identification information of an operator operating the image forming apparatus;

sending means for sending, when the original is determined to correspond to the predetermined special-document by the determining means, determination result information to an external unit; and adding means for adding additional information associated with the image forming operation and the identification information of the operator to the determination result information.

According to the above-mentioned configuration, counterfeit copying can be managed for each user (operator), and thus if a counterfeit copy has been performed, tracing investigation can be easily conducted. The managing apparatus may comprise means for sending to the image forming apparatus a signal used for changing at least one of the predetermined threshold level value and an image quality setting value of the image forming apparatus, according to the identification information of the operator.

There is provided a managing system for an image forming apparatus comprising an image forming apparatus and a managing apparatus placed at a position remote from the image forming apparatus and connected with the image forming apparatus via a communication line, wherein the image forming apparatus comprises:

a plurality of detecting means for detecting features of a predetermined special-document from image data of an original by comparing the image data with a registered image pattern;

determining means for determining whether or not the original corresponds to the predetermined special-document in accordance with the result obtained by the detecting means; and sending means for sending, when the original is determined to correspond to the predetermined special-document by the determining means, determination result information to an external unit, wherein the managing apparatus comprises means for sending information used for changing the image pattern to the image forming apparatus.

According to the above-mentioned configuration, the special-document which is prohibited to be duplicated is detected by comparing the original with the registered image pattern. It is determined whether or not the original corresponds to the special-document. The registered pattern such as a picture or a pattern is set to a pattern matching data, and the pattern matching data can be easily changed by the managing apparatus.

There is provided a managing system for an image forming apparatus comprising an image forming apparatus and a managing apparatus placed at a position remote from the image forming apparatus and connected with the image forming apparatus via a communication line, wherein the image forming apparatus comprising:

detecting means for detecting features of a predetermined special-document from image data of an original;

determining means for determining whether or not the original corresponds to the predetermined special-document in accordance with the detection result obtained by the detecting means; and sending means for sending, when the original is determined to correspond to the predetermined special-document by the determining means, image data corresponding to a predetermined portion of the original to the managing apparatus.

According to the above-mentioned configuration, since the image data corresponding to a predetermined portion of the original is sent to the managing apparatus when the original is determined to correspond to the predetermined special-document, tracing investigation can be easily conducted when a counterfeit copy is used.

Other objects, features and advantages of the present invention will become more apparent from the following detailed description when read in conjunction with the accompanying drawings.

BRIEF DESCRIPTION OF THE DRAWINGS

FIGS. 11A and 11B are timing charts showing operations of a CPU used as an IPU, a main CPU and a managing apparatus of an embodiment of a managing system of an image forming apparatus according to the present invention; FIG. 11A shows a case where a determination indicates that no counterfeiting is being conducted; FIG. 11B shows a case where the determination indicates that counterfeiting is being conducted.

FIGS. 12A and 12B are timing charts showing operations of a CPU used as an IPU, a main CPU and a managing apparatus of an embodiment of a managing system of an image forming apparatus according to the present invention; FIG. 12A shows a case where a determination indicates that no counterfeiting is being conducted; FIG. 12B shows a case where the determination indicates that counterfeiting is being conducted.

FIGS. 13A and 13B are timing charts showing operations of a CPU used as an IPU, a main CPU and a managing apparatus of an embodiment of a managing system of an image forming apparatus according to the present invention; FIG. 13A shows a case where a determination indicates that no counterfeiting is being conducted; FIG. 13B shows a case where the determination indicates that counterfeiting is being conducted.

FIGS. 14A and 14B are timing charts showing operations of a CPU used as an IPU, a main CPU and a managing apparatus of an embodiment of a managing system of an image forming apparatus according to the present invention; FIG. 14A shows a case where a determination indicates that no counterfeiting is being conducted; FIG. 14B shows a case where the determination indicates that counterfeiting is being conducted.

FIGS. 15A and 15B are timing charts showing operations of a CPU used as an IPU, a main CPU and a managing apparatus of an embodiment of a managing system of an image forming apparatus according to the present invention; FIG. 15A shows a case where a determination indicates that no counterfeiting is being conducted; FIG. 15B shows a case where the determination indicates that counterfeiting is being conducted.

FIGS. 16A and 16B are timing charts showing operations of a CPU used as an IPU, a main CPU and a managing apparatus of an embodiment of a managing system of an image forming apparatus according to the present invention; FIG. 16A shows a case where a determination indicates that no counterfeiting is being conducted; FIG. 16B shows a case where the determination indicates that counterfeiting is conducted.

DETAILED DESCRIPTION OF THE INVENTION

Figure 1:
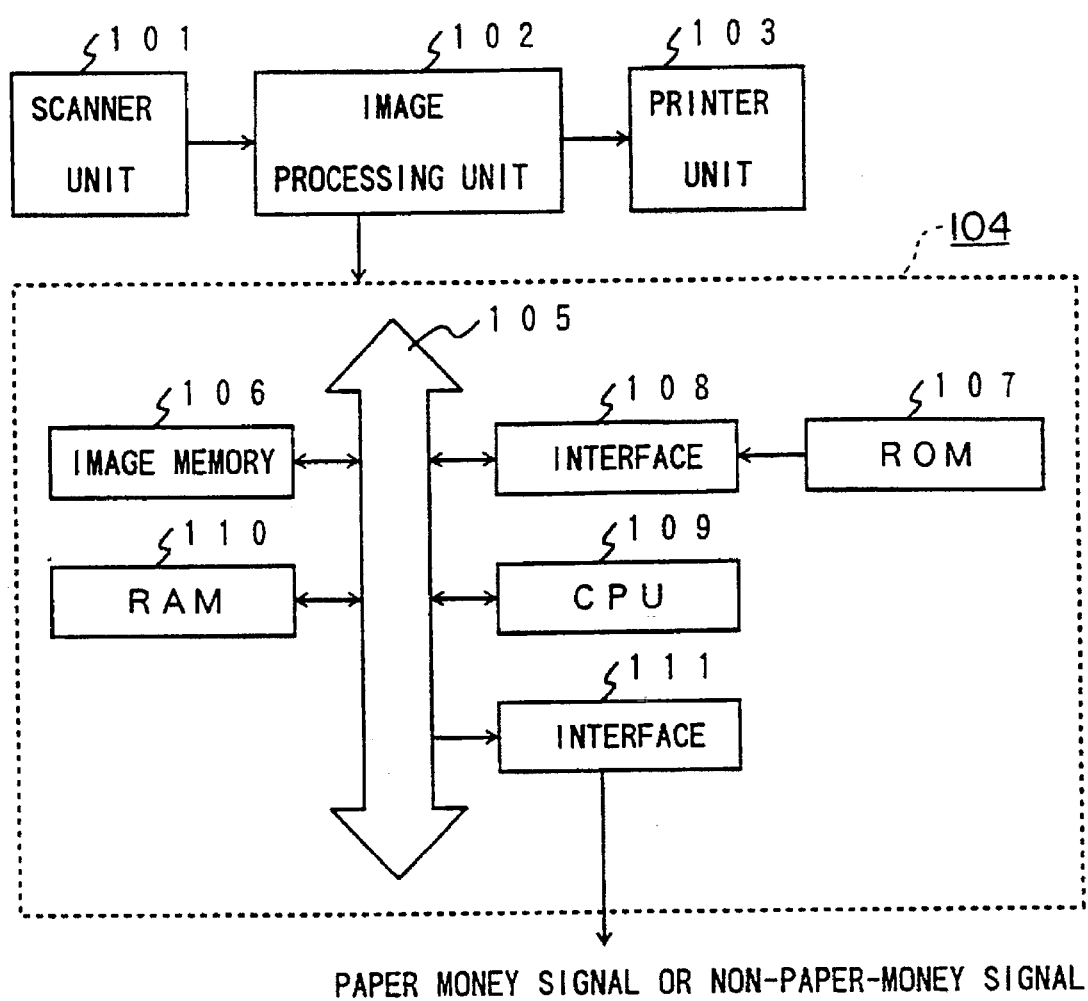
FIG. 1 is a block diagram of a structure of an image forming apparatus in which a first embodiment of a special-document discriminating apparatus according to the present invention is incorporated.

A description will now be given, with reference to FIG. 1, of a first embodiment of a special-document discriminating apparatus according to the present invention. FIG. 1 is a block diagram of a structure of an image forming apparatus in which the first embodiment of a special-document discriminating apparatus according to the present invention is incorporated.

The image processing apparatus (copy machine) comprises: a scanner unit 101 scanning an original to be copied; image processing unit 102 processing image data; and a printer unit 103 printing an image in accordance with the image data from the image processing unit 102. The scanner unit 101 supplies the scanned data to the image processing unit 102 as image data. The image processing unit 102 applies, for example, shading, gamma-correction and a gradation processing to the image data supplied by the scanner unit 101. The image data processed by the image processing unit 102 is output to the printer unit 103, and then an image corresponding to the image data is, for example, printed on a recording paper.

This image forming apparatus is also provided with a paper money discrimination controlling circuit board 104 corresponding to a special-document discriminating apparatus according to the present invention. The controlling circuit board 104 receives the image data via the image processing unit 102 so as to determine whether or not the original corresponding to the image data is a sheet of paper money.

The paper money discriminating circuit board 104 comprises an image memory 106, a ROM 107, an interface 108, a CPU 109, a RAM 110 and another interface 111. The image memory 106 receives and stores the image data via a bus 105, and also stores data and/or software necessary for determining whether or not the input image data corresponds to paper money.

The ROM 107 is detachably attached on the controlling circuit board 104 via the interface 108 which may be a typical IC connector. The ROM 107 stores a program (software) used for discriminating a paper money. The CPU 109 determines whether or not the image data corresponds to paper money in accordance with the program. The CPU 109 and the ROM 107 are interconnected via the bus 105 and the interface 108. The RAM 110 is a memory for a working area for the CPU 109.

The results of the determination performed on the image data by the CPU 109 are output to a main controlling unit (not shown) of the image forming apparatus via the interface 111.

A description will now be given of an operation performed by the above-mentioned image forming apparatus.

Prior to a copying operation, it is determined whether or not the ROM 107 is mounted via the interface 108 on the paper money discrimination controlling circuit board 104. If it is determined that the ROM 107 is not mounted on the controlling circuit board 104, the entire function of the image forming apparatus cannot be effective, and thus no copying operation can be performed. The determination whether or not the ROM 107 is mounted may be performed by electrically checking if the ROM 107 is connected, or may be performed by checking if a predetermined data (magic number) is stored in a predetermined address of the ROM 107. The image data scanned by the scanner unit 101 is supplied to a shading, T-correction and degradation process, and copied on a recording sheet in the printer unit 103.

On the other hand, the image data scanned by the scanner unit 101 is sent simultaneously to the controlling circuit board 104 from the image processing unit 102. The determination is then performed whether or not the image data corresponds to paper money. There is no specific limitation to the determining method performed by the paper money discrimination controlling circuit board 104. For example, similarly to the conventional apparatus, the determining method may be such a method in which a degree of resemblance is obtained by means of pattern matching in accordance with the image data and pattern data registered in the ROM 107 so as to determine whether or not the original corresponds to paper money.

The CPU 109 generates a paper money signal when the image data is determined to correspond to paper money, and otherwise generates a non-paper-money signal. These signals are sent via the interface 111 to the controlling unit of a main unit of the image processing apparatus. The controlling unit stops the copying operation when the paper money signal is input so that unlawful duplication of paper money is prevented. When the non-paper-money signal is input indicating that the original does not correspond to a paper money, the copying operation continues.

When adding discrimination information caused by an issue of new paper money, only the ROM 107 (old ROM) is removed from the interface 108, and replaced with a ROM (new ROM) in which information for the new paper money is stored. As mentioned above, the paper money discrimination controlling circuit (special-document discriminating apparatus) which handles new paper money can be easily constructed by merely replacing the ROM 107. Therefore, as compared to the conventional way in which the whole apparatus is replaced, the modification for coping with new paper money can be done at a reduced cost.

The fact that the ROM 107 can be easily removed involves a risk that a copy of a paper money can be performed by removing the ROM 107. However, in the present embodiment, the copy machine does not operate at all when it is determined that the ROM 107 is not mounted, and thus such risk can be eliminated.

Additionally in other case such as when a new discrimination method is established, augmentation and alteration of the method can be easily performed, and thus it is useful for improvement of the discrimination accuracy.

Figure 2:
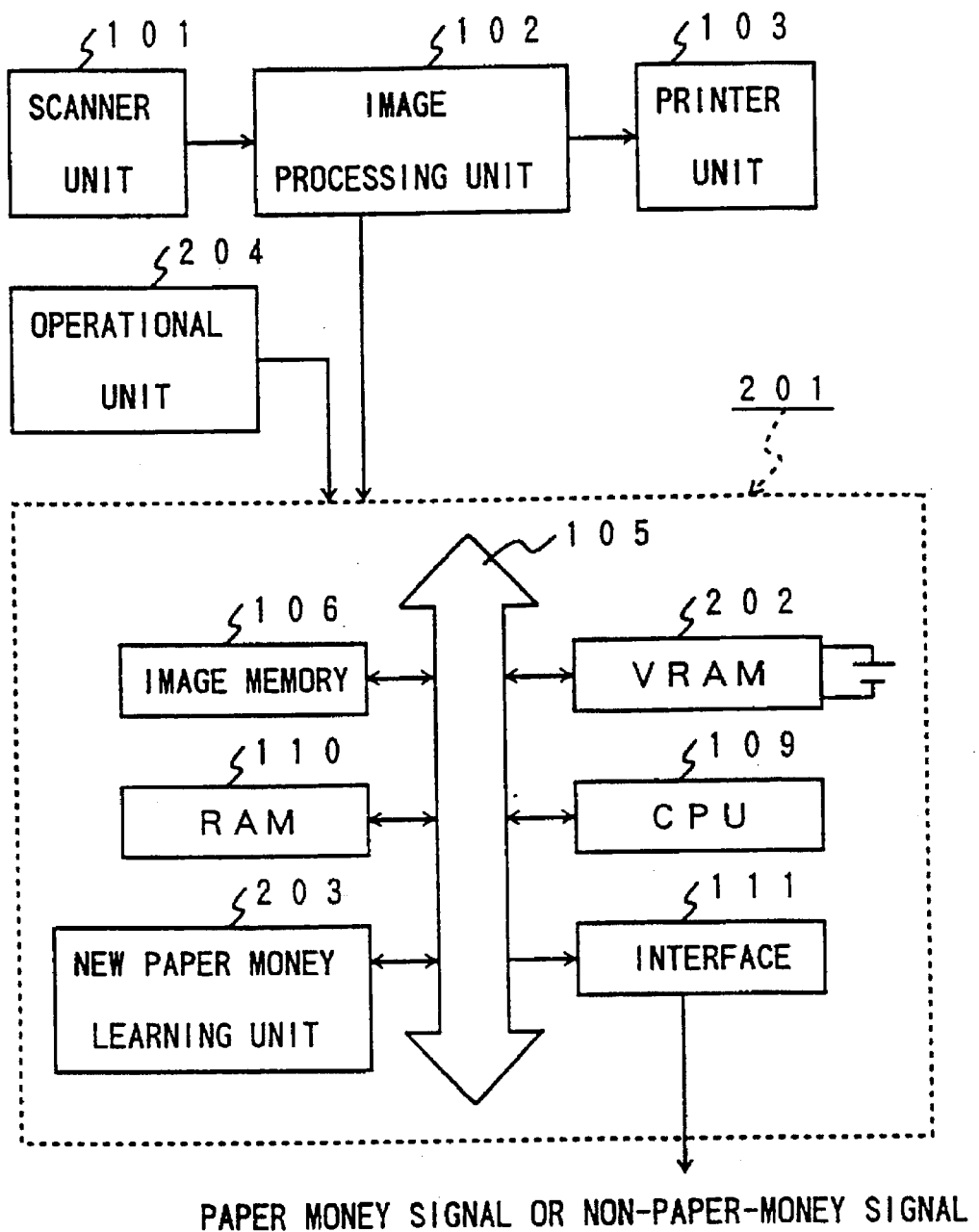
FIG. 2 is a block diagram of a structure of an image forming apparatus in which another embodiment of a special-document discriminating apparatus according to the present invention is incorporated.

A description will now be given, with reference to FIG. 2, of a second embodiment of a special-document discriminating apparatus according to the present invention. FIG. 2 is a block diagram of a structure of an image forming apparatus in which a second embodiment of a special-document discriminating apparatus according to the present invention is incorporated.

In the present embodiment, a paper money discrimination controlling circuit board 201 is used instead of the controlling circuit board of the first embodiment mentioned above. The paper money discrimination controlling circuit board 201 comprises: a VRAM 202 which stores data necessary for discriminating input image data; a CPU 109 performing the discrimination; and a new paper money learning unit 203 which learns new paper money information from the input image data and stores it in the VRAM 202. Additionally, an operational unit 204, comprising for example a keyboard, is provided for assigning a new paper money learning mode. Other structures are the same as that of the first embodiment mentioned above, and descriptions thereof will be omitted.

A description will now be given of a new paper money learning operation of the second embodiment. When new paper money is issued, in the second embodiment, features of the new paper money are learned using a test pattern for new paper money learning in the new paper money learning mode. The test pattern for new paper money learning is, for example, a pattern in which only the red seal portion of the Japanese Yen bill is printed. The reason that such a test pattern is used is that merely placing new paper money on a contact glass of a copy machine for obtaining new paper money information is construed as an unlawful act.

In the new paper money learning operation, the test pattern is placed by an operator in a predetermined position of the scanner unit 101, and the new paper money learning mode is assigned via the operational unit 204. The test pattern has features necessary only for learning the new paper money. By using the test pattern, new paper money information can be input without reading of the true paper money by the scanner 101. That is, the learning operation can be performed without having the risk of committing an unlawful duplication of new paper money.

When the learning mode is assigned, the new paper money learning unit 203 learns automatically the new paper money information from the image data (i.e., data having features necessary only for learning the new paper money) input by the scanner unit 101, and the information is stored in the RAM 202. At this time, the VRAM 202 may overflow if the capacity thereof is small. In such a case, the new paper money information may be registered by deleting the registered information corresponding to the oldest paper money. Alternately, the lowest value paper money may be deleted.

As mentioned above, in the second embodiment, since the new paper money information can be learned using the test pattern, it is able to handle the new paper money at a reduced cost without replacing the apparatus.

Figure 3:
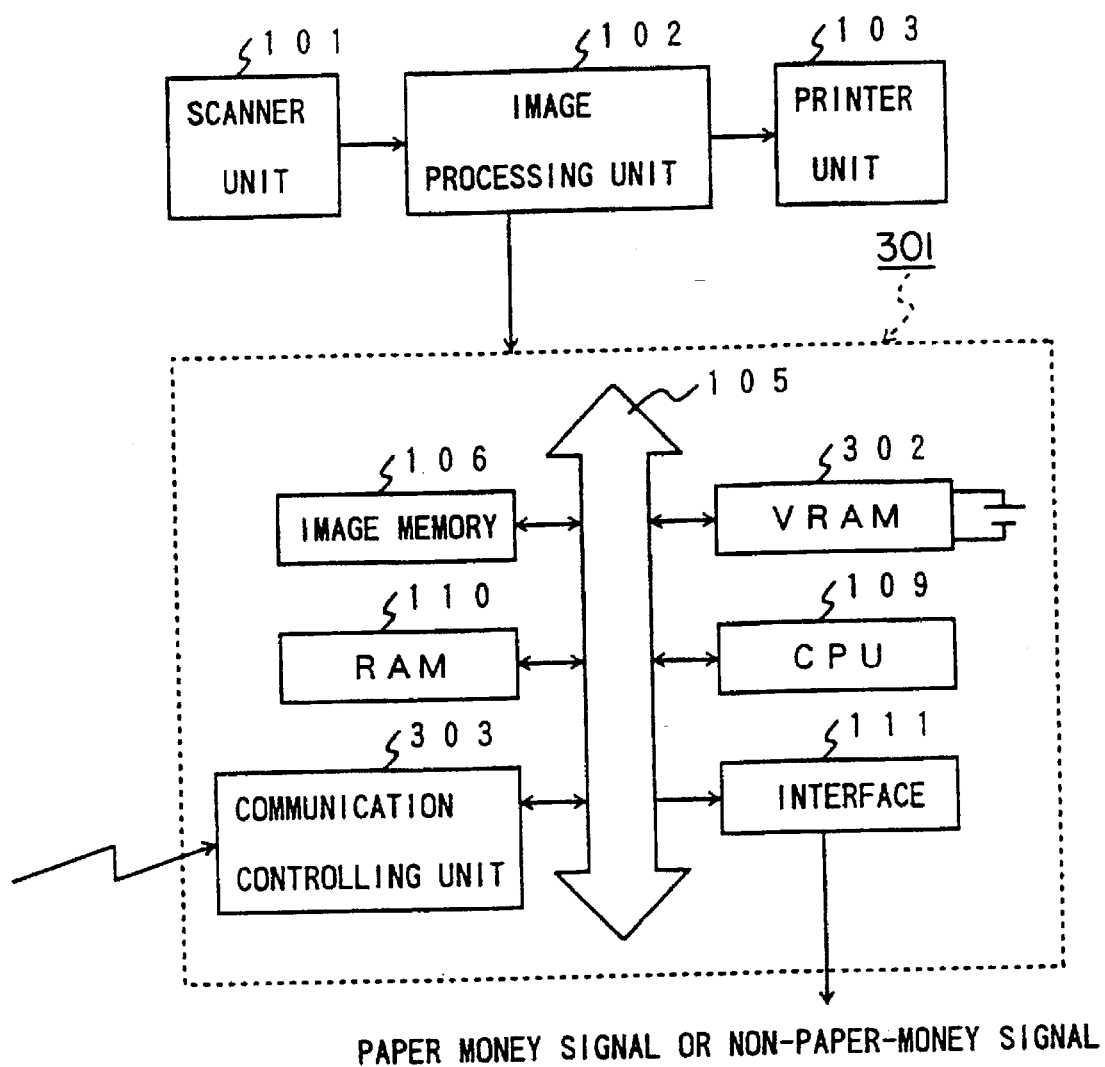
FIG. 3 is a block diagram of a structure of an image forming apparatus in which another embodiment of a special-document discriminating apparatus according to the present invention is incorporated.

A description will now be given, with reference to FIG. 3, of a third embodiment of a special-document discriminating apparatus according to the present invention. FIG. 3 is a block diagram of a structure of an image forming apparatus in which a third embodiment of a special-document discriminating apparatus according to the present invention is incorporated.

In the present embodiment, a paper money discrimination controlling circuit board 301 is used instead of the controlling circuit board 104 of the first embodiment mentioned above. The paper money discrimination controlling circuit board 301 comprises: a VRAM 302 which stores data necessary for discriminating input image data; a CPU 109 performing the discrimination; and a communication controlling unit 303 which stores new paper money information input from an external device in the VRAM 302. Other structures are the same as that of the first embodiment mentioned above, and descriptions thereof will be omitted.

A description will now be given of an inputting operation of the new paper money information in the third embodiment mentioned above. When new paper money is issued, in the third embodiment, the new paper money information is sent to the new paper money discrimination controlling circuit board 301 via a communication network (such as a telephone network). When the new paper money information is input, the communication controlling unit 303 connected to the communication network adds the new paper money information to the contents of the VRAM 302. At this time, the VRAM 302 may overflow if the capacity thereof is small. In such a case, the new paper money information may be registered by deleting the registered information corresponding to the oldest paper money. Alternately, the lowest value paper money information may be deleted.

As mentioned above, in the third embodiment, by inputting the new paper money information to the special-document discriminating apparatus from a remote location using the communication network, it is able to handle the new paper money at a reduced cost without replacing the apparatus.

In the above-mentioned third embodiment according to the present invention, individual special-document discriminating apparatuses located in remote places are connected using the communication network. Such a system in which the special-document discriminating apparatus and a managing apparatus are connected to each other is capable of having various functions other than remote inputting operation of the new paper money. Example of the functions are described below.

Figure 4:
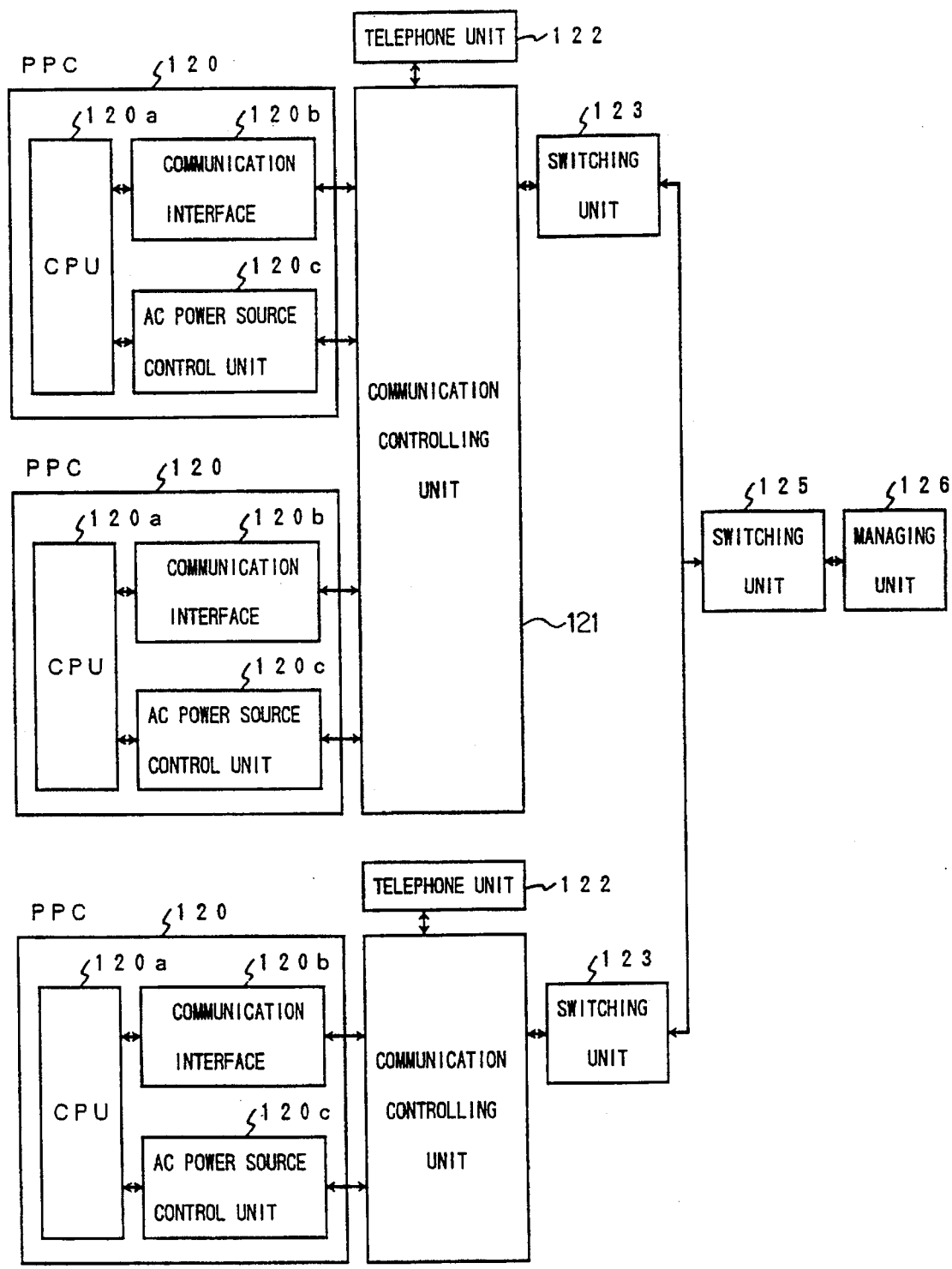
FIG. 4 is a block diagram of a structure of a managing system of a PPC (copy machine) according to the present invention.

A description will now be given of a structure of an image forming apparatus managing system according to the present invention, in which image forming apparatus a special-document discriminating apparatus is incorporated. FIG. 4 is a block diagram of a structure of a PPC (copy machine) 120 and a managing system thereof. The PPC 120 comprises a CPU 120a, a communication interface 120b and an AC power source controlling unit 120c. One or more PPCs 120 are connected to a communication controlling unit 121. A telephone unit 122 is connected to each controlling unit 121. Each communication controlling unit 121 is connected to a central managing apparatus 126 located in a remote place via switching units 123 and 125.

Figure 5:
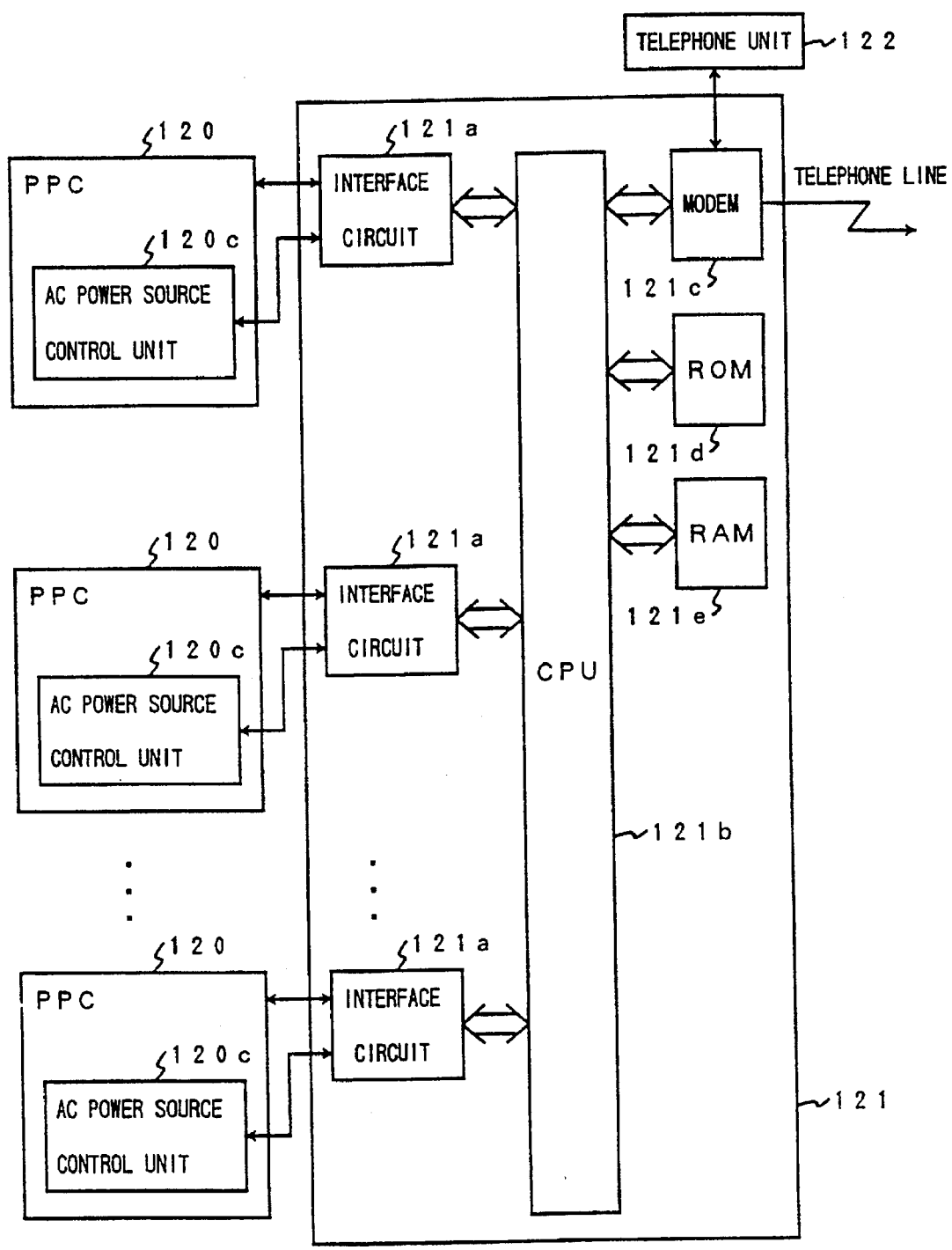
FIG. 5 is a block diagram showing an internal structure of the communication control unit shown in FIG. 4.

FIG. 5 is a block diagram showing a structure of the communication controlling unit 121. The communication controlling unit 121 comprises: interfacing circuit 121a interfacing between the power source controlling unit 120c of each PPC 120 and the CPU 121b; a CPU 121b controlling each unit in the communication controlling unit 121; a modem 121c connecting the telephone unit 122 and telephone line 124 to the CPU 121b; and ROMs 121d and 121e connected to the CPU 121b. The communication controlling unit 121 performs TTL level serial communication with each PPC 120 via the interfacing circuit 121a.

Figure 6:
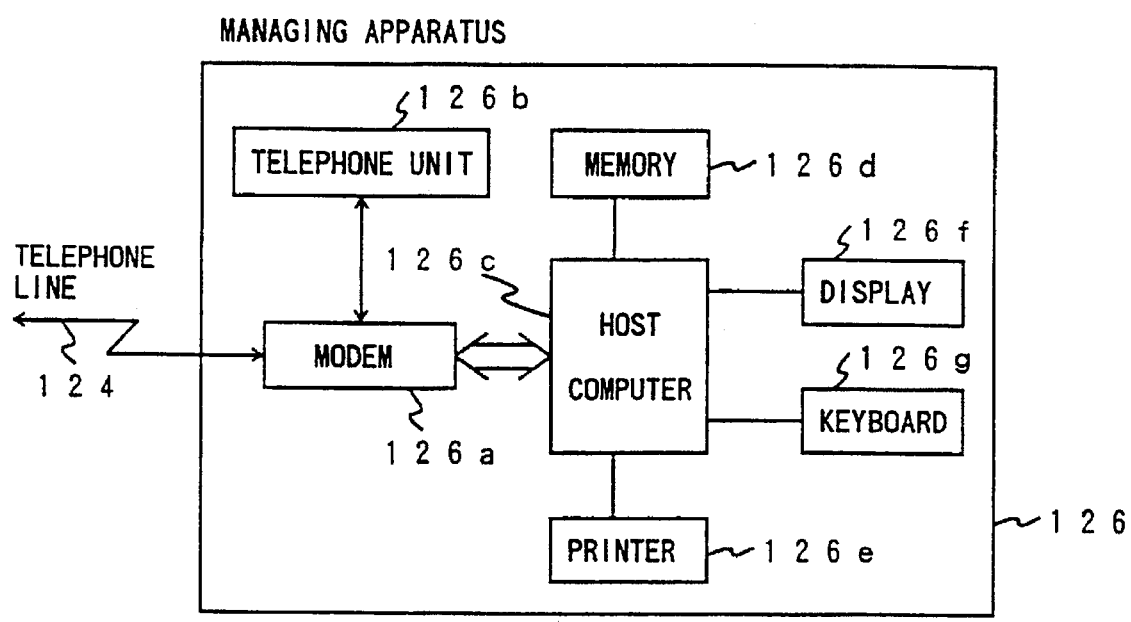
FIG. 6 is a block diagram showing an internal structure of the managing apparatus shown in FIG. 4.

FIG. 6 is a block diagram of a structure of the managing apparatus 126. The managing apparatus 126 comprises a modem 126a, a telephone unit 126b, a host computer 126c, a memory 126d connected to the host computer 126c, a printer 126e, a display 126f and a keyboard 126g. The modem 126a is connected to the telephone line 124 so as to receive signals via the telephone line 124. The modem 126 is also connected to the telephone unit 126b and the host computer 126c.

Figure 7:
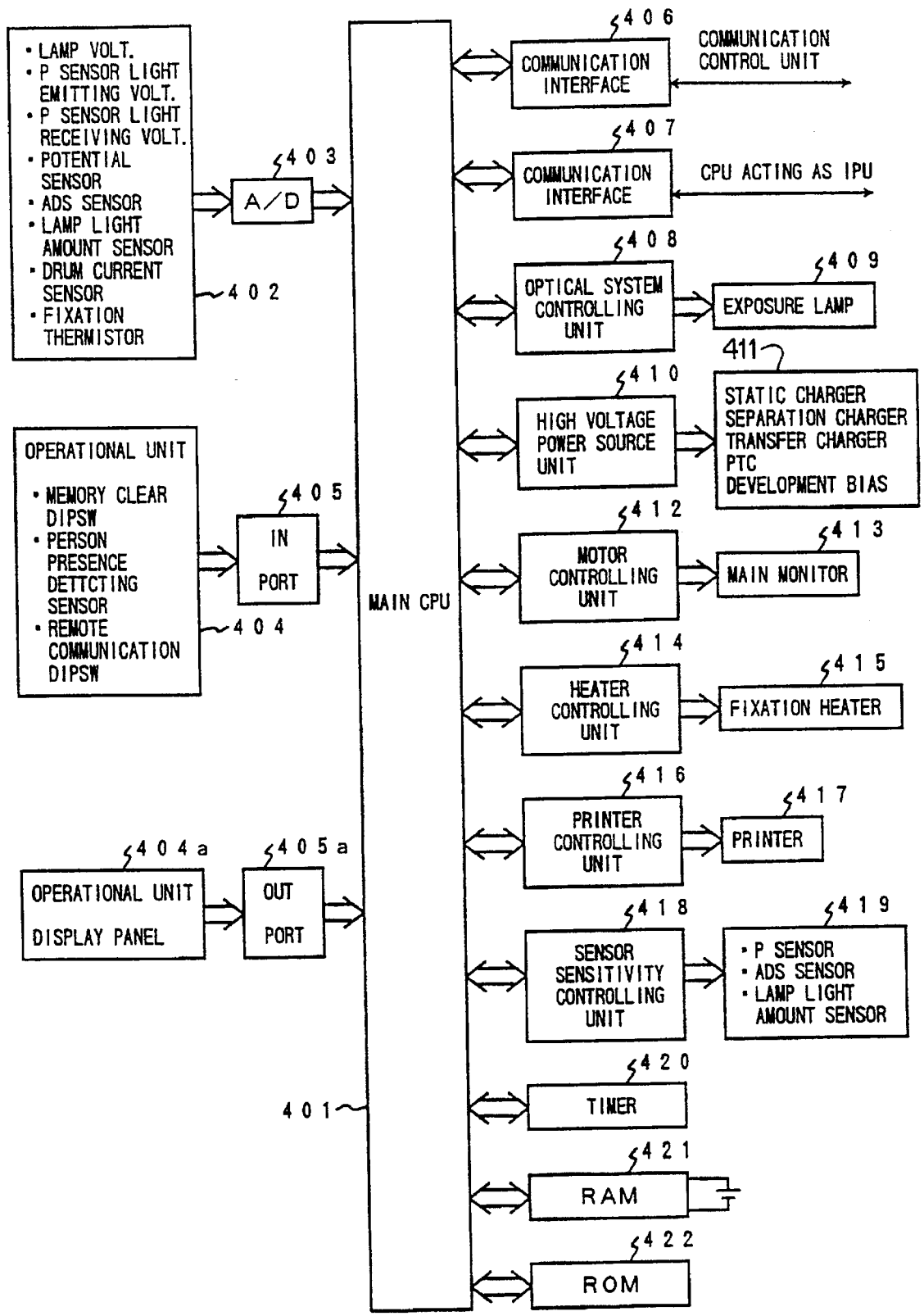
FIG. 7 is a block diagram showing a general structure of the main CPU excluding an image processing unit of the PPC.

FIG. 7 is a block diagram of a general structure of the main CPU of the PPC 120 excluding an image processing unit. The main CPU 401 is connected via an A/D converter 403 with a group of sensors 402 including various sensors such as a photosensitive electric potential sensor, a P sensor, an ADS sensor, a light amount sensor, a drum current sensor and fixation thermistor. The A/D converter 403 converts analog signals input from the group of sensors 402 into digital signals. An operational unit 404 comprising a memory clear DIPSW, person presence detecting sensor and a remote communication controlling DIPSW is connected to the main CPU 401 via an IN port 405. Additionally, an operational unit 404a having a display panel is connected to the main CPU 401 via an OUT port 405a. Controlling signals are sent to the operational unit 404a via the OUT port 405a.

The main CPU 401 is connected to: a communication interface 406 performing communication with the communication controlling unit 121; a communication interface 407 performing communication with the CPU 120a; an optical system controlling unit 408 controlling an exposure lamp 409 performing exposure; a high voltage power source unit 410 controlling charging means 411 including a static charger, a separation charger, a transfer charger, a PTC and a development bias; a motor controlling unit 412 controlling a main motor; a heater controlling unit 44 controlling a fixing heater 415; printer controlling unit 416 controlling a printer 417; a sensitivity controlling unit 418 controlling a group of sensors 419 such as a P sensor, an ADS sensor and a light amount sensor; a timer 420; a RAM 421 (comprising a calendar IC and having a real-time clock) function; and a ROM 422.

In the above-mentioned structure, the main CPU 401 controls various controlling operations such as an operational mode control, paper conveying control, process control for the photosensitive drum, various condition setting operation control for special-documents such as a paper money or securities. Additionally, the main CPU 401 performs selection processing with regard to communication with the communication controlling unit 121 and the managing apparatus 126 so that communication of commands is handled by the main CPU and communication of image data is handled by the IPU.

Figure 8:
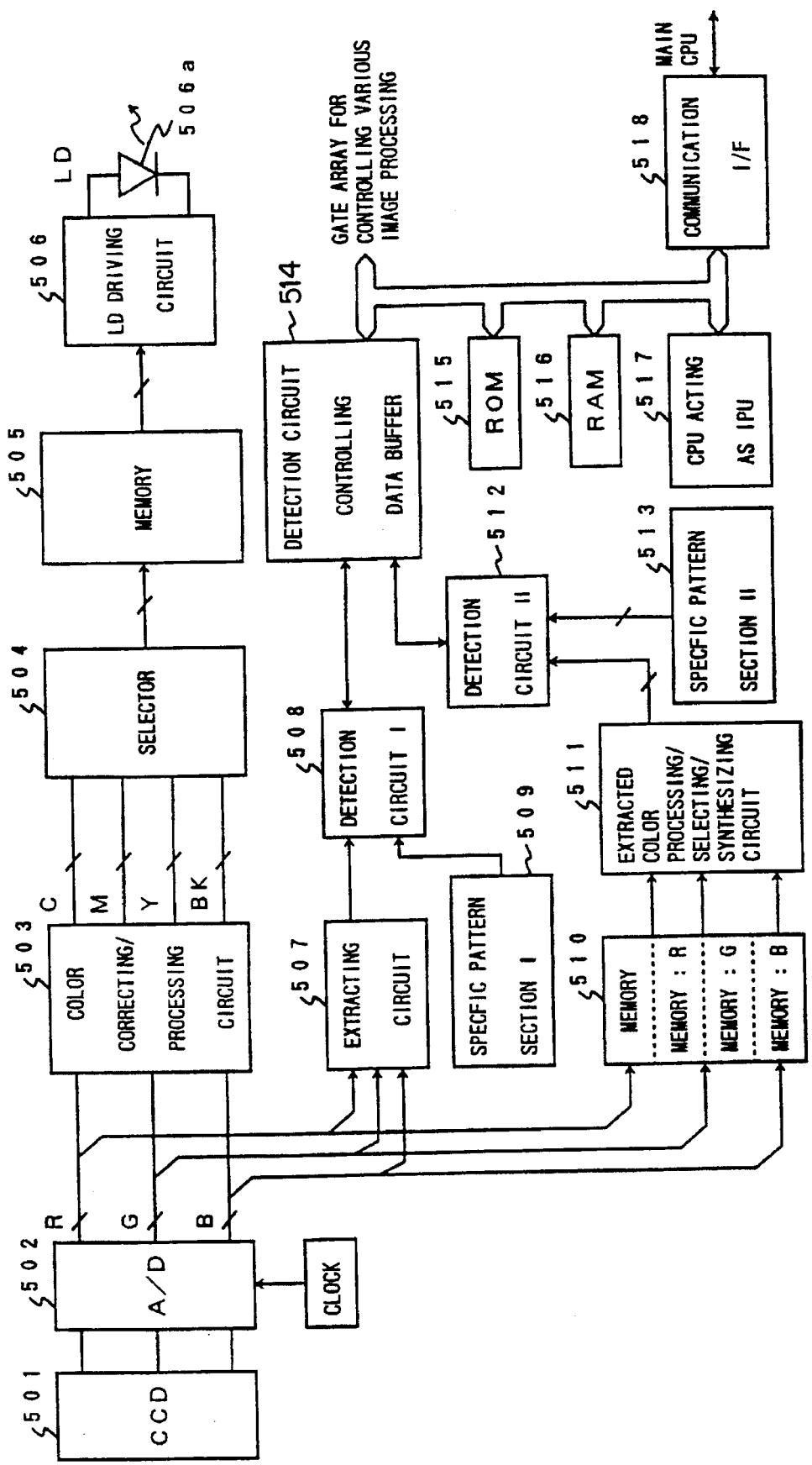
FIG. 8 is a block diagram showing a structure of an IPU, a CPU used as an IPU and peripheral components thereof.

FIG. 8 is a block diagram of a structure of the CPU for the IPU shown in FIG. 7, which CPU is serially connected to the main CPU, and peripheral components thereof. In FIG. 8, a CCD 501 scans an original to generate image data, and an A/D converter 502 converts analog image information output from the CCD 501 into digital image information. A color correcting/processing circuit 503 performs color correction and color processing on signals R, G, B output from the A/D converter 502. A selector 504 selectively outputs signals BK, C, M, Y supplied by the color correcting/processing circuit 503. A memory 505 temporarily stores the signals output from the selector 504. An LD driving circuit 506 drives a laser diode 506a in accordance with signals output from the memory 505.

An extracting circuit 507 extracts a specific pattern from the R, G, B signals output from the A/D converter 502. A detection circuit I 508 determines whether or not the specific pattern (pattern of a special-document) read out from a specific pattern section I coincides with the pattern read out by the extracting circuit 507. That is, the detecting circuit I 508 determines whether or not the input image data corresponds to a special-document such as paper money. A memory 510 stores the R, G, B signals output from A/D converter 502. An extracted color processing selecting and synthesizing circuit 511 extracts the R, G, B signals output from the memory 510, and applies a color processing and selectively synthesizes them. A detection circuit II 512 determines whether or not the signal output from the extracted color processing selecting and synthesizing circuit 511 coincides with the specific pattern (pattern of a special-document) read out from a specific pattern section II 513. That is, the detecting circuit II 512 determines whether or not the input image data corresponds to a special-document such as paper money. A data buffer 514 for controlling the detection circuit stores result information of the detection from the detection circuit II 512. ROMs 515 and 516 and a CPU 517 used as IPU are connected via a bus to a communication interface 518 so as to communicate with the main CPU 401.

FIG. 8 shows an embodiment in which two detection circuits (508 and 512) are provided. The detection result output from each detection circuit is stored in a control data buffer 514 connected to a data bus provided for the CPU 517 used as IPU. Accordingly, the detection results indicating whether or not counterfeiting has occurred are sent to the CPU 517 via the data bus. Additionally, the detection results can be transferred to an external device through the telephone line 104 via the data bus and the communication interface 518.

The specific pattern section 509 corresponding to the detection circuit I 508 stores image pattern data of a predetermined portion of special securities. The image data is input to the extracting circuit 507 in real time during an image forming operation. When the extracting circuit extracts a specific pattern, the image data and the specific pattern stored in the specific pattern section I 509 are input to the detection circuit I 508 in synchronization with each other. That is, this process is a rapid detecting process which can determine whether or not the image data corresponds to a special-document together with and without delaying the image forming operation.

The specific pattern section II 513 (comprising an EEPROM or a non-volatile RAM) stores image pattern data corresponding to a predetermined portion of specific securities. The hardware structure of the specific pattern section II 513 is substantially the same as that of the specific pattern section I 509. Scanning of the original is performed independently of the image forming operation, and image data is temporarily stored in the memory 510. Thereafter, the image data is subject to extracted color processing and synthesizing by the extracted color processing selecting and synthesizing circuit 511. The image data is also subject to arithmetic processing so that the image data has a format similar to that of recognition data in the specific pattern section II 513, and then the data is stored in the detection circuit II 512. In the embodiment shown in FIG. 8, although the circuit 511 is independently provided, the circuit 511 may be incorporated into the hardware for the image forming operation. It should be noted that by using detection circuit 512, the arithmetic processing can be performed without synchronizing with a series of image forming processes. Due to this, a time spent on the detection is long, however, the detection accuracy increases as compared to a case where a time is spent for the pattern matching performed by the detection circuit I 508.

Figure 9:
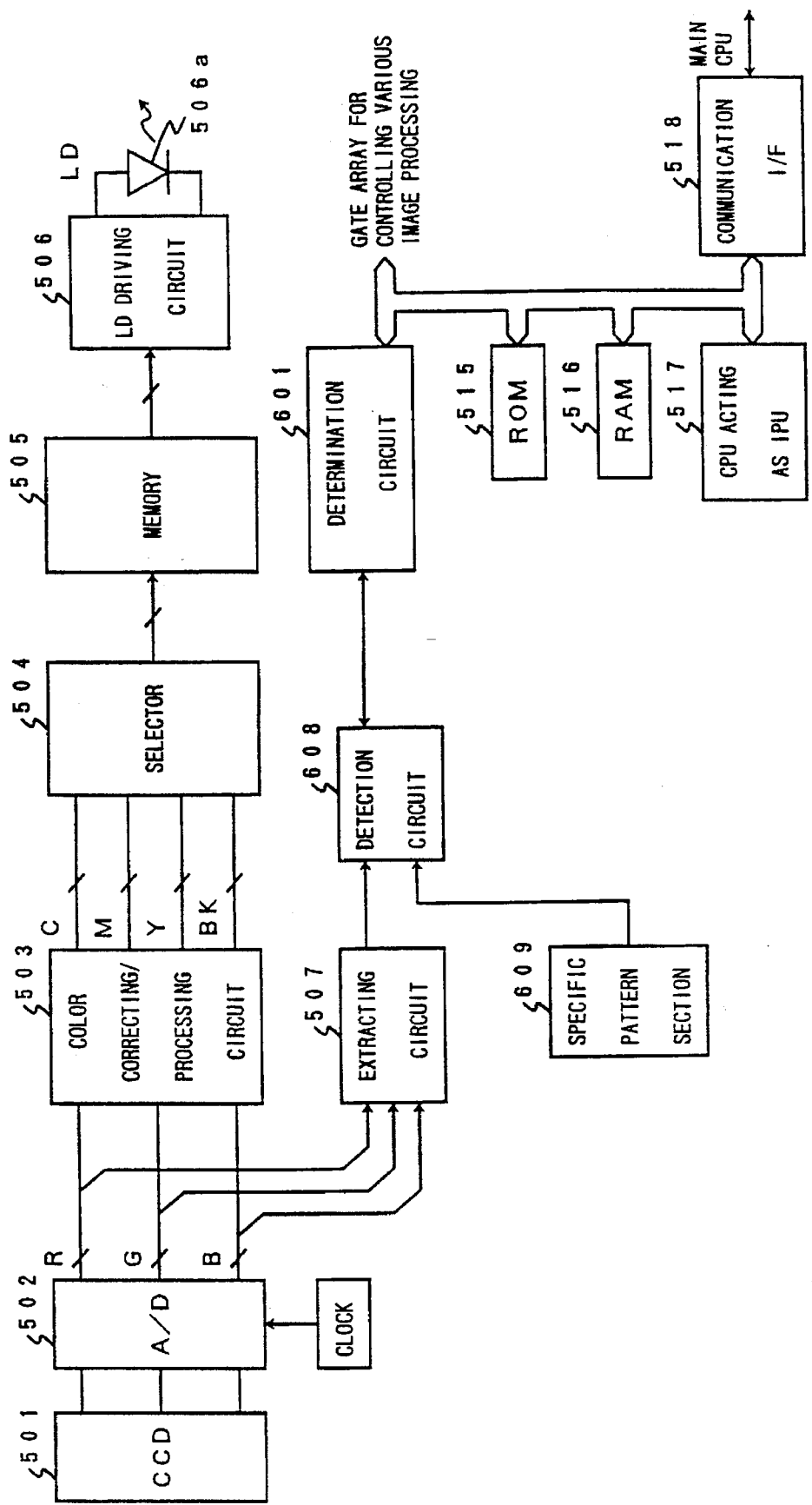
FIG. 9 is a block diagram of an embodiment having a counterfeit preventing circuit and a determining circuit which determines a whether or not a counterfeit is being made.

FIG. 9 shows an embodiment having a determining circuit 601 for determining whether or not counterfeiting is performed as well as a counterfeit preventing circuit. In this embodiment, determination level data is sent to a CPU 517 from the main CPU 401 by means of serial communication. Data from an extracting circuit 507 and a specific pattern section 609 are input to a detection circuit 608, and compared with each other. The result is output to the determining circuit 601. The determining circuit 601 determines whether or not the detection result indicates a counterfeit, according to the determination level. The determination result information is transferred to the main CPU 401 via an interface 518. Other components are the same as that shown in FIG. 8, and thus descriptions thereof will be omitted.

Figure 10:
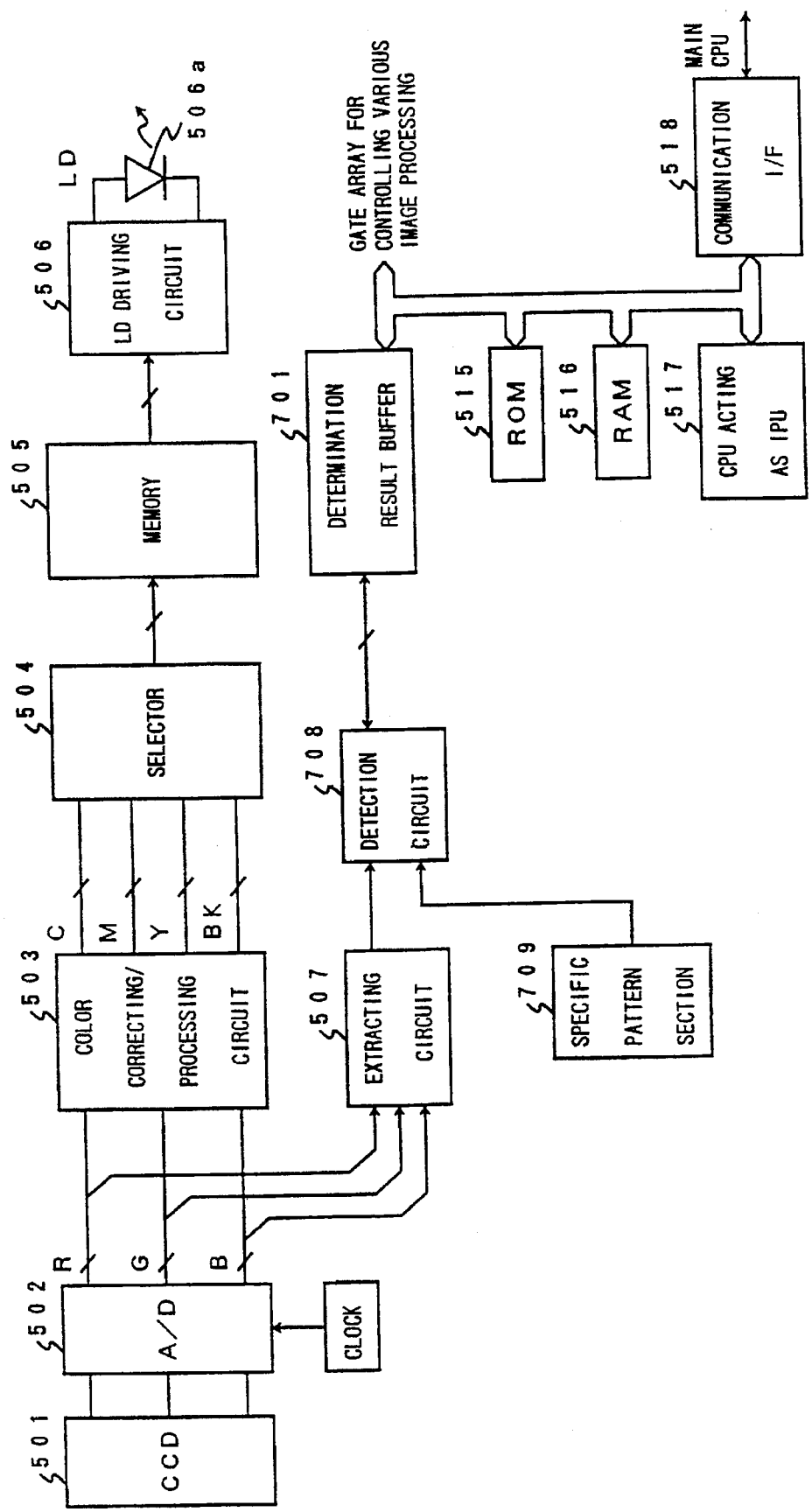
FIG. 10 is a block diagram of an embodiment including a counterfeit preventing circuit and only a detecting circuit which detects a pattern comparison result provided for determining whether or not a counterfeit is being made.
Figure 15B:
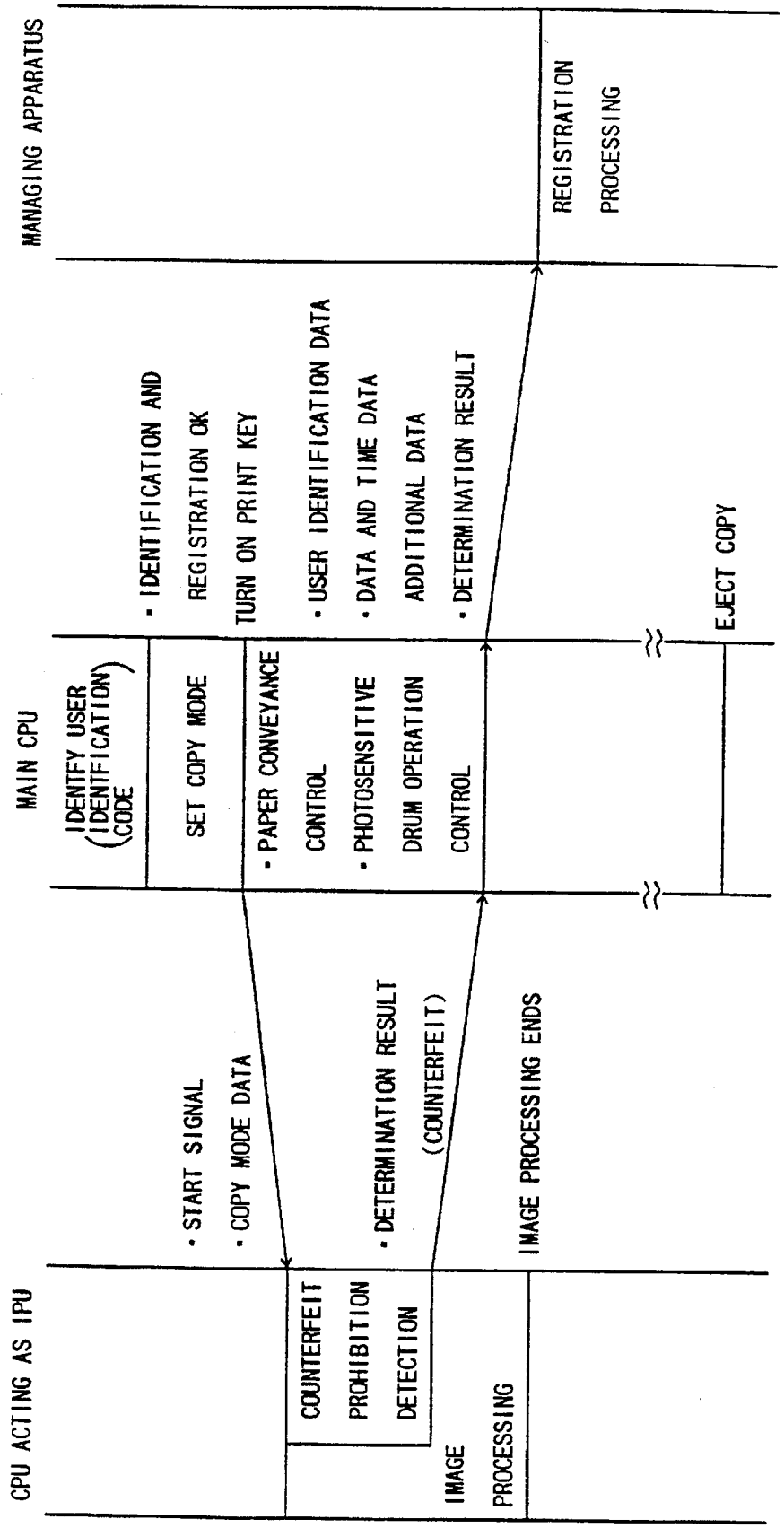

FIG. 10 shows an embodiment having only a detection circuit 708 which detects a pattern comparison result for determining whether or not counterfeiting is performed, as well as a counterfeit preventing circuit. Data from the extraction circuit 507 and a specific pattern section 709 are input to the detection circuit 708, and compared with each other. The result is output to a buffer 701. The data temporarily stored in the buffer 701 is transferred to the main CPU 401 via the interface 518. The main CPU 401 or the managing apparatus 126 determines whether or not counterfeiting is being performed in accordance with the transferred result. Other components are the same as that shown in FIG. 8, and thus descriptions thereof will be omitted.

FIGS. 11A and 11B through FIGS. 16A and 16B show timing charts showing operations of the CPU 517 used as an IPU, the main CPU 401 and the managing apparatus of the embodiments mentioned above. Each figure with the suffix A shows a case where a determination indicates that no counterfeiting is being conducted; each figure with the suffix B shows a case where the determination indicates that counterfeiting is being conducted.

FIGS. 17 through 24 are flow charts showing operations shown in FIGS. 11A and 11B through FIGS. 16A and 16B.

Figure 17:
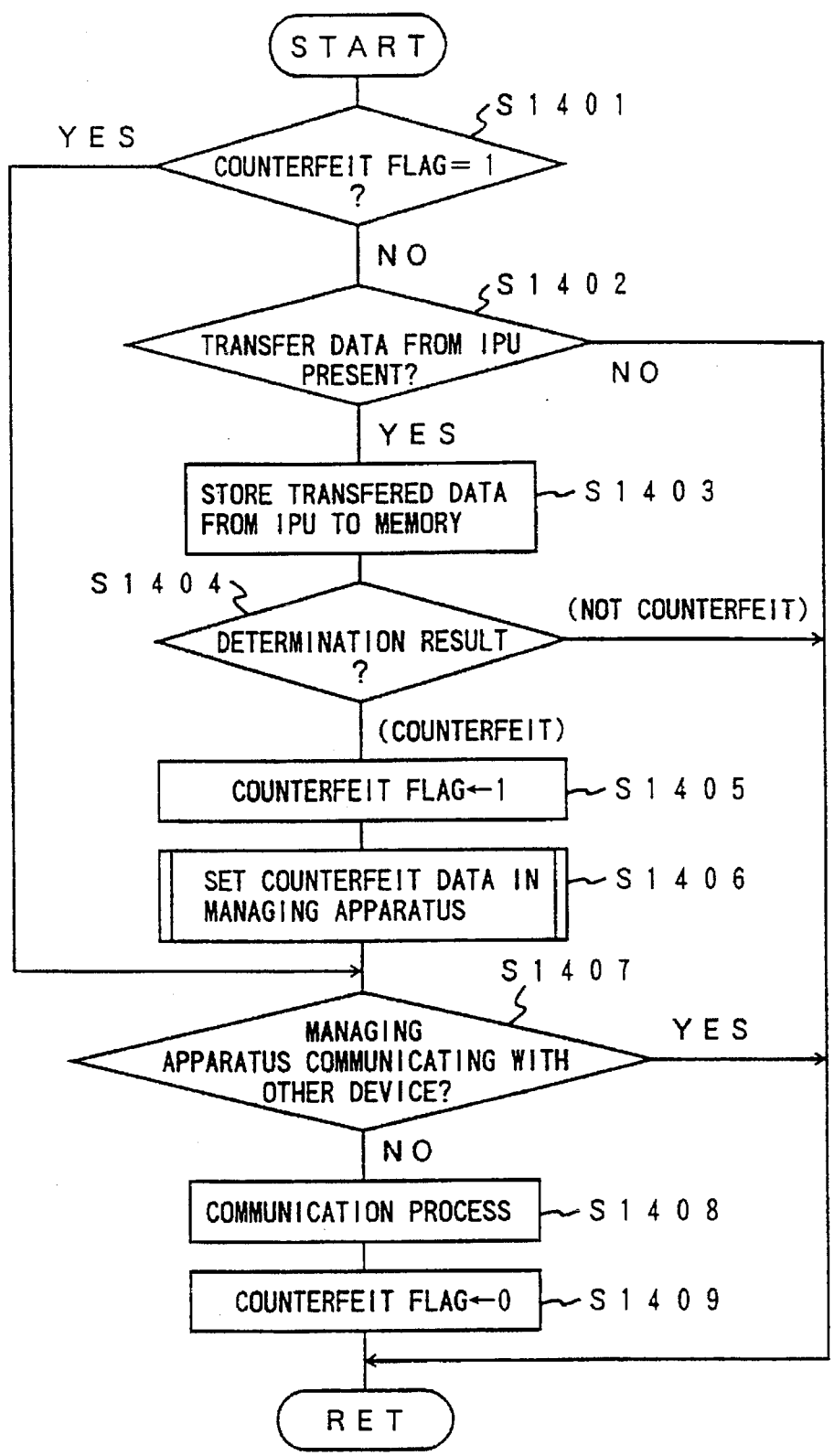
FIG. 17 is a flow chart of an operation of a managing system, according to the present invention, for image forming apparatuses.

FIG. 17 is a flow chart of an operation of the embodiment of FIGS. 11A and 11B. When a copying operation is started, it is determined, in step 1401 (hereinafter step is abbreviated S), whether or not a counterfeit flag is set to "1". If it is determined that the counterfeit flag is not set to "1", it is determined, in S1402, whether or not data to be sent from the IPU is present. If it is determined that the data is present, the data is stored, in S1403, in a memory. Thereafter, it is determined, in S1404, whether or not counterfeiting is being conducted. If it is determined that a counterfeit is conducted, the counterfeit flag is set, in S1405, to "1", and then an inputting operation of the counterfeit data to the managing apparatus 126 is started in S1406. In S1407, it is determined whether or not the managing apparatus 126 is communicating with other devices. If it is determined that the managing device is not communicating with other devices, a communication is performed in S1408. The counterfeit flag is then set to "0" in S1409, and then the routine returns to the first step. If it is determined, in S1401, that the counterfeit flag is "1", the routine proceeds to S1407 so that the communication is immediately performed. Additionally, if it is determined, in S1402, that no data to be sent is present, if it is determined, in S1404, that no counterfeiting is being conducted, or if it is determined, in S1407, that the managing apparatus 126 is communicating with other devices, the routine also returns to the first step.

The description "the managing apparatus is communicating with other devices" refers to the communication line being in the "busy" state. Additionally, when the counterfeit flag is "1", the determination represents that a counterfeit is conducted, while when the counterfeit flag is "0", the determination represents that no counterfeit is conducted.

Figure 18:
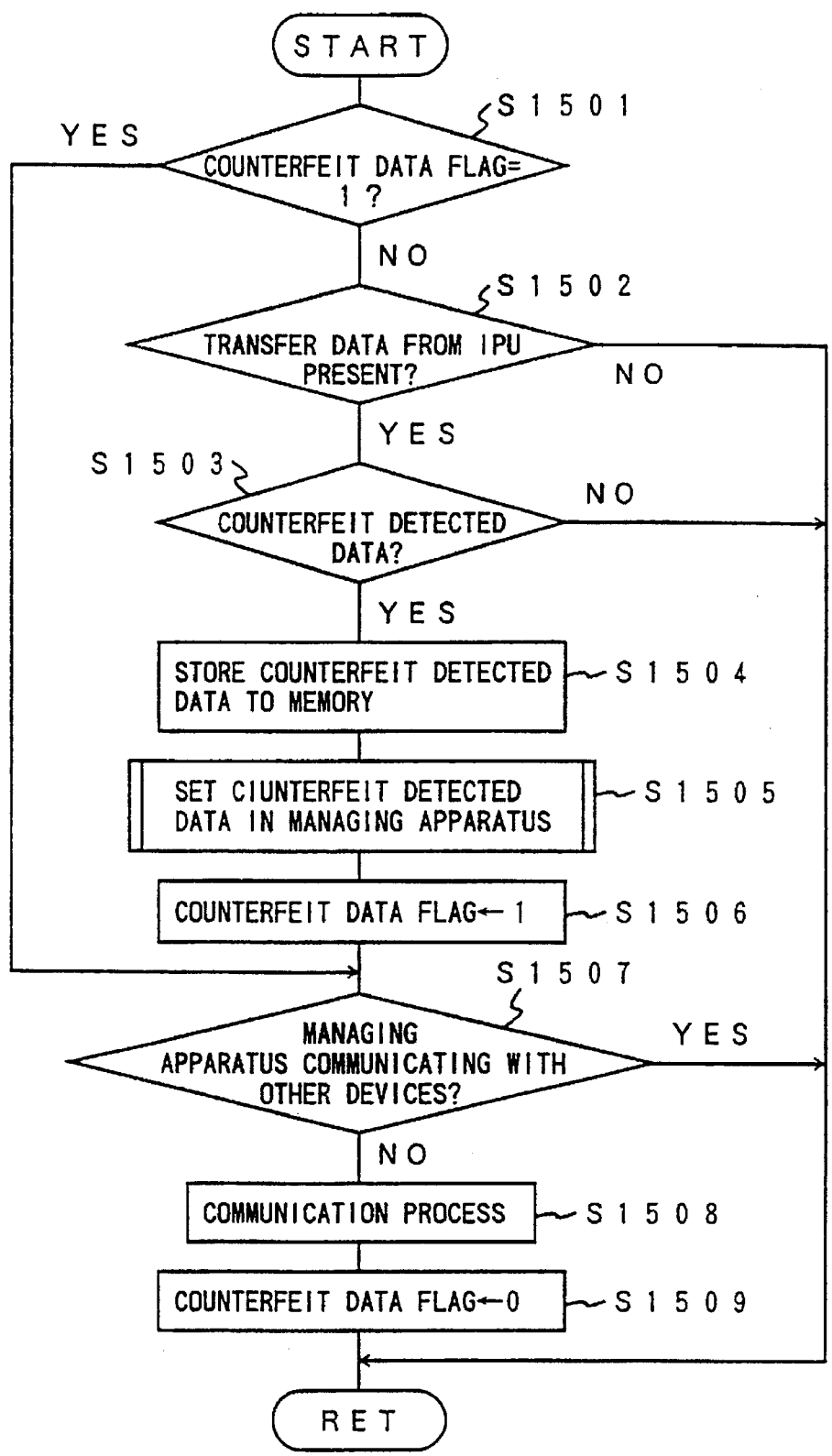
FIG. 18 is a flow chart of an operation of a managing system, according to the present invention, for image forming apparatuses.

FIG. 18 is a flow chart of an operation of the embodiment of FIGS. 12A and 12B. When a copying operation is started, it is determined, in step S1501, whether or not a counterfeit data flag is set to "1". If it is determined that the counterfeit data flag is not set to "1", it is determined, in S1502, whether or not data to be sent from the IPU is present. If it is determined that the data is present, it is determined, in S1503, whether or not the data corresponds to data to be detected as a counterfeit. If it is determined that the data is to be detected as counterfeit, the counterfeit detecting data is stored in a memory. Thereafter, an operation of sending the counterfeit detecting data to the managing apparatus is started in S1505. The counterfeit data flag is set, in S1506, to "1", and then it is determined, in S1507, whether or not the managing apparatus 126 is communicating with other devices. If it is determined that the managing device is not communicating with other devices, a communication is performed in S1508. The counterfeit data flag is then set to "0" in S1509, and then the routine returns to the first step. If it is determined, in S1501, that the counterfeit data flag is "1", the routine proceeds to S1507 so that the communication is immediately performed. Additionally, if it is determined, in S1502, that no data to be sent is present, if it is determined, in S1503, that the data does not correspond to the counterfeit detecting data, or if it is determined, in S1507, that the managing apparatus 126 is communicating with other devices, the routine also returns to the first step. The above-mentioned counterfeit data flag represents a request flag for requesting a transfer of the determination result to the managing apparatus 126.

In the communication process in the above mentioned steps S1408 or S1508, when transferring the determination result or counterfeit detecting data to the managing apparatus 126, additional data such as data for user identification, copy mode, time, serial number, copy mode before a predetermined number of copies, may be transferred together. These data are stored in a NVRAM connected to the main CPU 401. The attribute data, counterfeit flag and counterfeit data flag are maintained even if power of the image forming apparatus is turned off. It should be noted that this operation corresponds to the embodiments described with reference to FIGS. 13A and 13B and FIGS. 15A and 15B.

Figure 19:
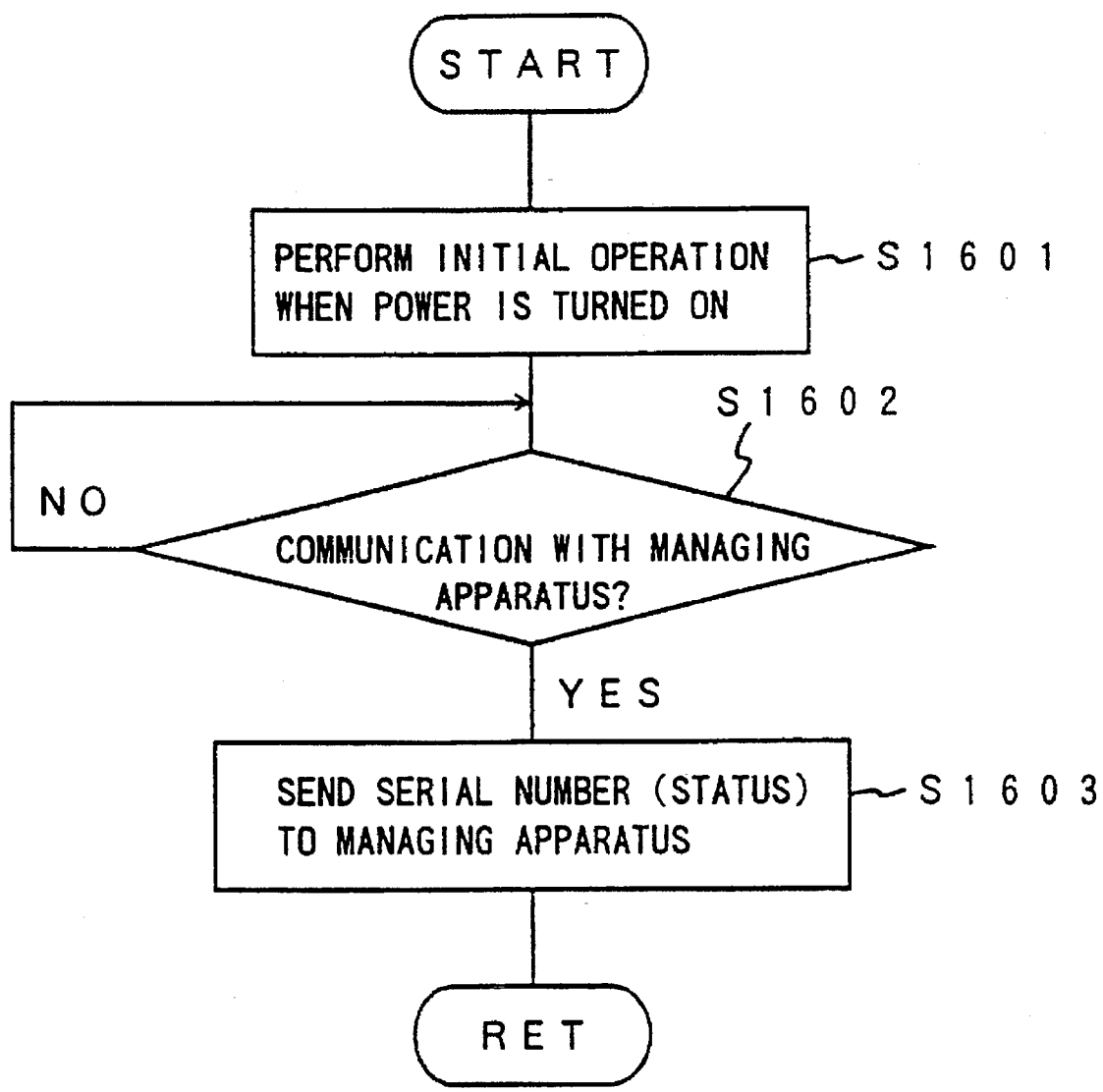
FIG. 19 is a flow chart of an operation of a managing system, according to the present invention, for image forming apparatuses.
Figure 20:
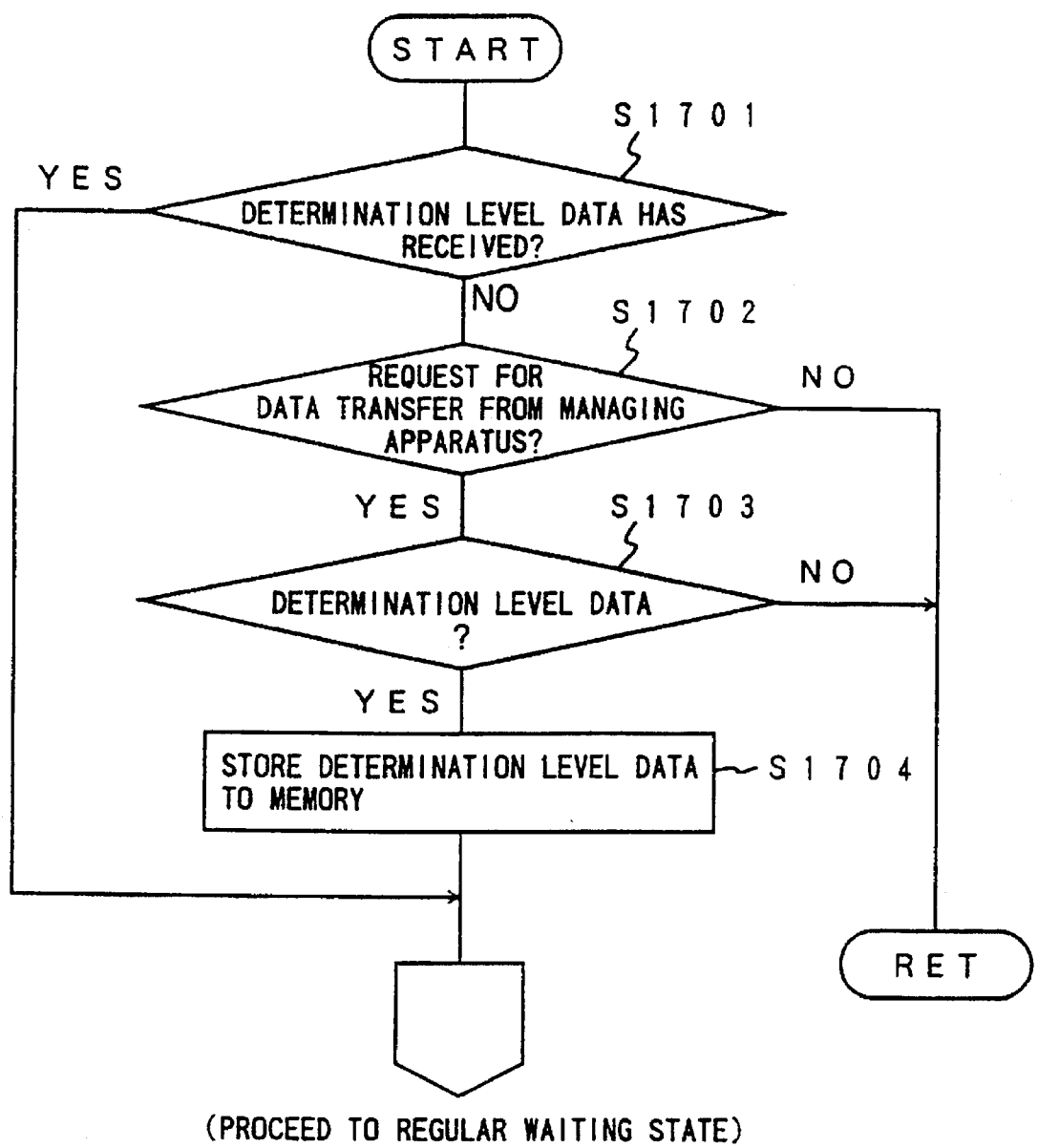
FIG. 20 is a flow chart of an operation of a managing system, according to the present invention, for image forming apparatuses.

FIGS. 19 and 20 are flow charts of operations of embodiments in which operations the determination is performed in accordance with determination level data (threshold level value) sent from the managing apparatus 126. In S1601, an initial operation is performed, and then it is determined, in S1602, whether or not a communication with the managing apparatus 126 can be performed. If it is determined that the communication can be performed, a serial number (status) is sent, in S1603, to the managing apparatus. In an operation shown in FIG. 20, it is determined, in S1702, whether or not the determination level data has been received. If it is determined that the determination level data has not been received, it is determined, in S1702, whether or not a request for transfer has been made by the managing apparatus 126. If it is determined that the request has been made, it is determined, in S1703, whether or not the determination level data is present. If it is determined that the determination level data is present, the determination level data is stored, in S1704, to a memory, and the operation proceeds to a regular waiting state. If it is determined, in S1701, that the determination level data has been received, the operation immediately proceeds to the regular waiting state. On the other hand, if it is determined, in S1702, that the request has not been received, or it is determined, in S1703, that the determination level data is not present, the operation returns to the first step.

By performing the above-mentioned operations shown in FIGS. 19 and 20, the image forming apparatus sends the status data such as a serial number to the managing apparatus 126 when power is turned on, and the state of the image forming apparatus proceeds to the regular waiting state after receiving from the managing apparatus 126 the determination level data (threshold level value) corresponding to its status data. The reception of the determination level data can be made at another time. In such a case, the operation can be performed in the same way as the regular operation of transferring the status data between the managing apparatus 126 and the PPC 120.

Figure 21:
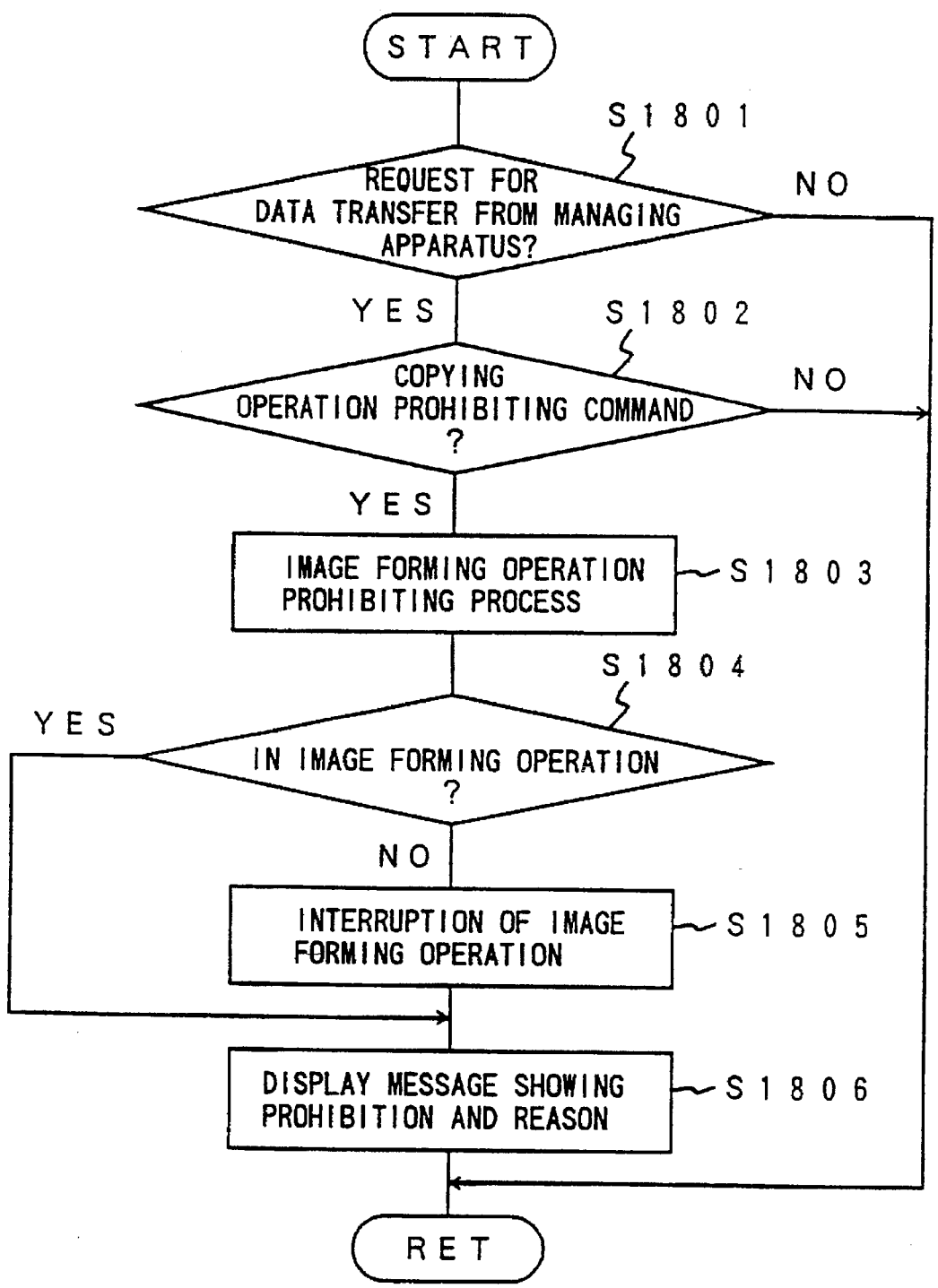
FIG. 21 is a flow chart of an operation of a managing system, according to the present invention, for image forming apparatuses.
Figure 22:
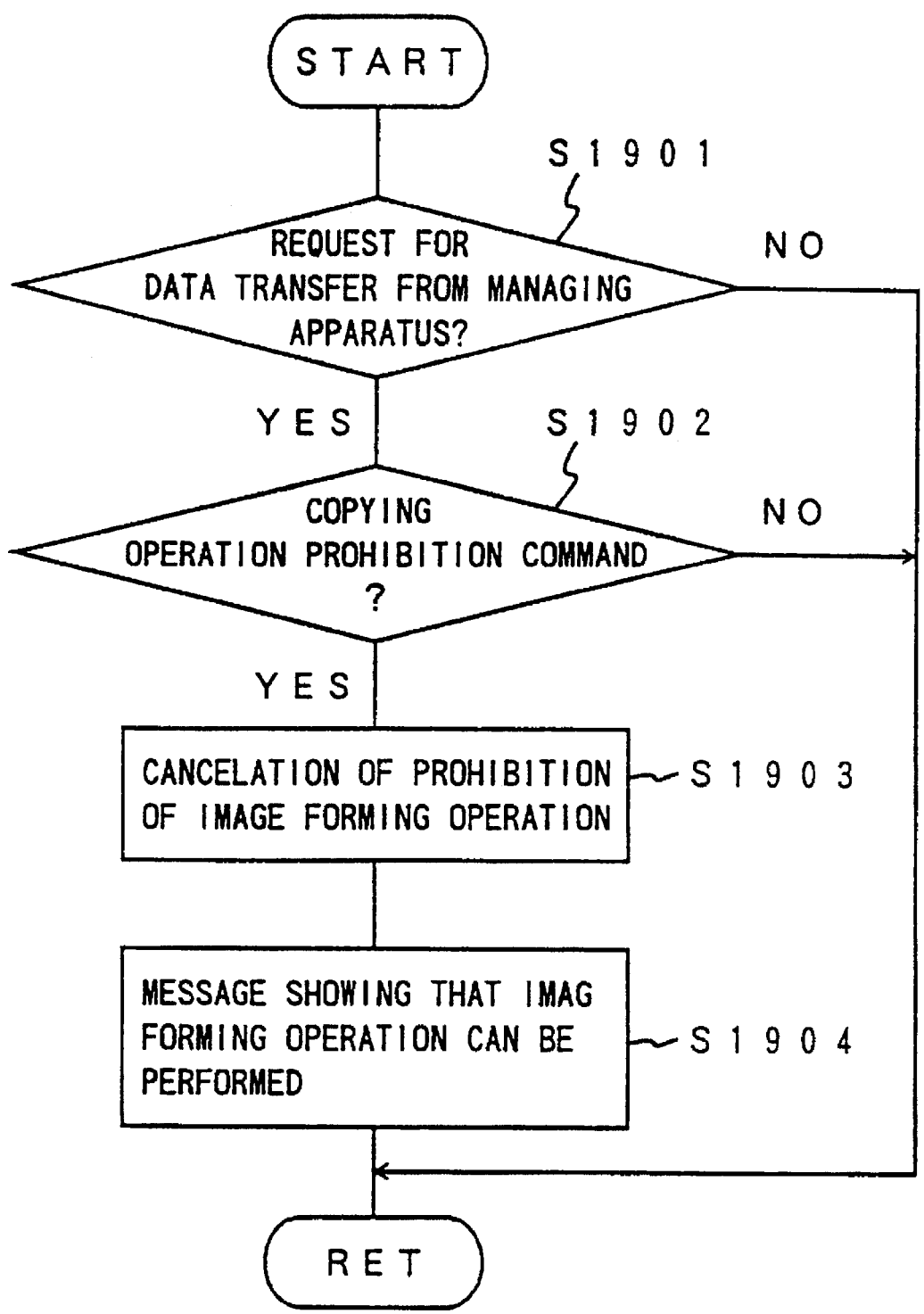
FIG. 22 is a flow chart of an operation of a managing system, according to the present invention, for image forming apparatuses.

FIGS. 21 and 22 show operations of the embodiment shown in FIGS. 14A and 14B. When the operation shown in FIG. 21 is started, it is determined, in S1801, whether or not a request for data transfer has been made by the managing apparatus 126. If it is determined that the request has been made, it is determined, in S1802, whether or not a copying operation prohibiting command is present. If it is determined that the copying operation prohibiting command is present, a prohibiting process for an image forming operation is performed in S1803. It is determined, in S1804, whether or not the image forming apparatus is in an image forming operation. If it is determined that the image forming apparatus is not in an image forming operation, interruption of the image forming operation is executed in S1805. A guidance message is displayed, in S1806, which shows prohibition of a copy and the reason for the prohibition. It should be noted that transferring to the managing apparatus is the same as in the operation shown in FIGS. 17 and 18. If it is determined, in S1804, that the image forming apparatus is in an image forming operation, the operation immediately proceeds to S1806 where the guidance message is displayed, informing of prohibition of copy and the reason for the prohibition. If it is determined, in S1801, that the request has not been made, or if it is determined, in S1802, that the copying operation prohibiting command is not present, the operation returns to the first step.

When the operation shown in FIG. 22 is started, it is determined, in S1901, whether or not a request for data transfer has been made by the managing apparatus 126. If it is determined that the request has been made, it is determined, in S1902, whether or not the copying operation prohibition cancel command is present. If it is determined that the copying operation prohibition cancel command is present, a cancellation process for the prohibition of an image forming operation is performed in S1903. Thereafter, a guidance message is displayed informing that an image forming operation can be performed.

Figure 16B:
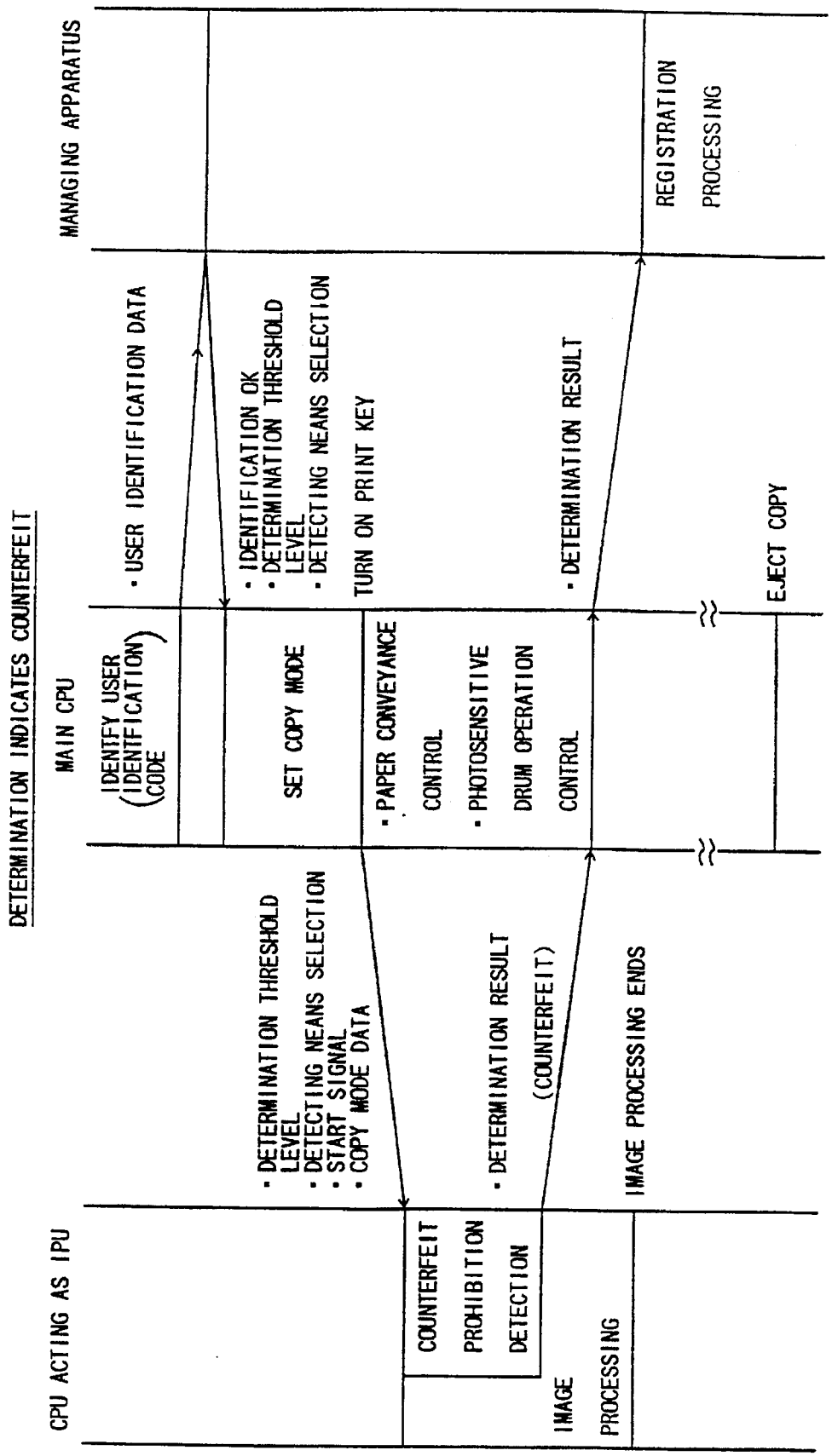
Figure 23:
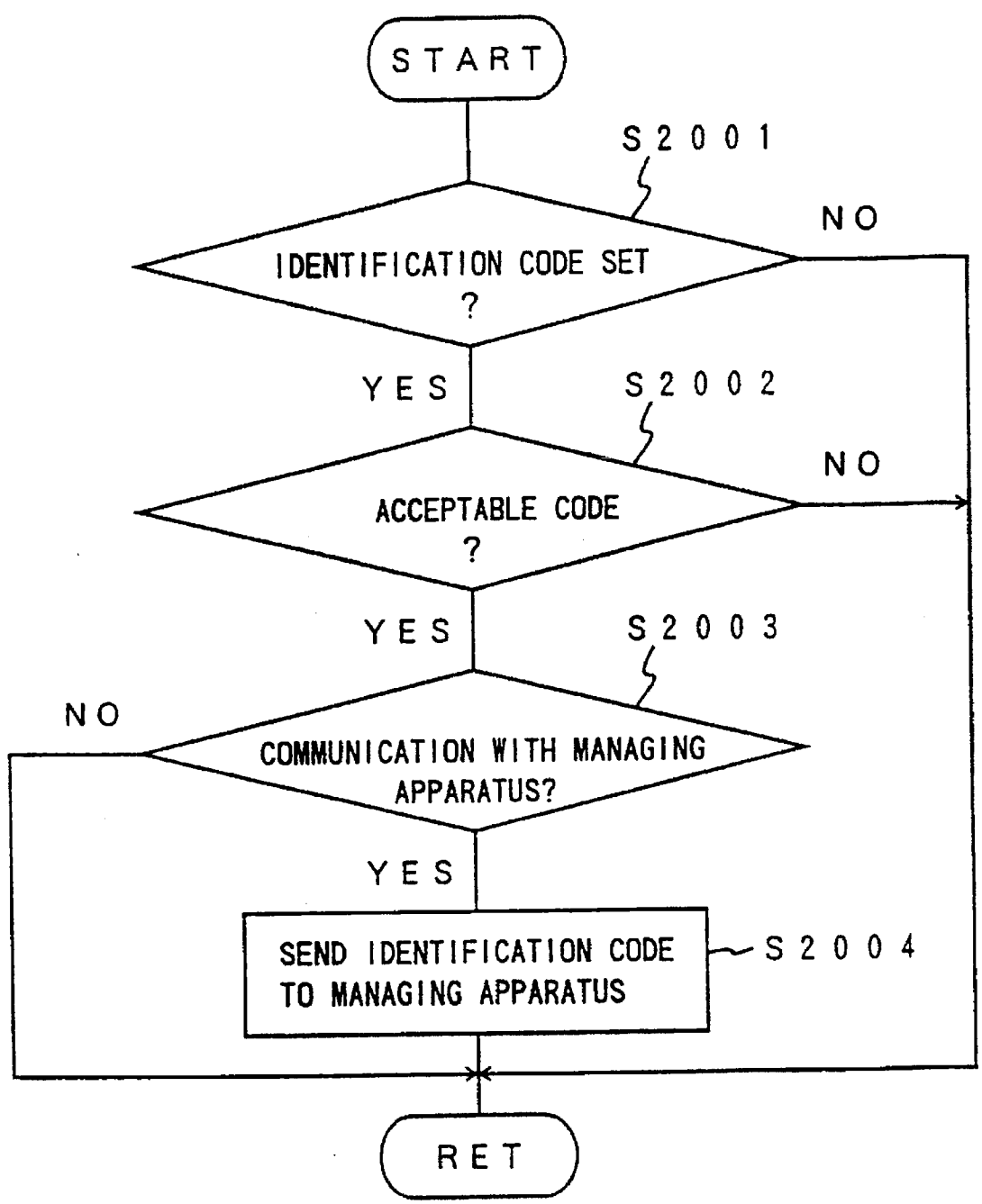
FIG. 23 is a flow chart of an operation of a managing system, according to the present invention, for image forming apparatuses.
Figure 24:
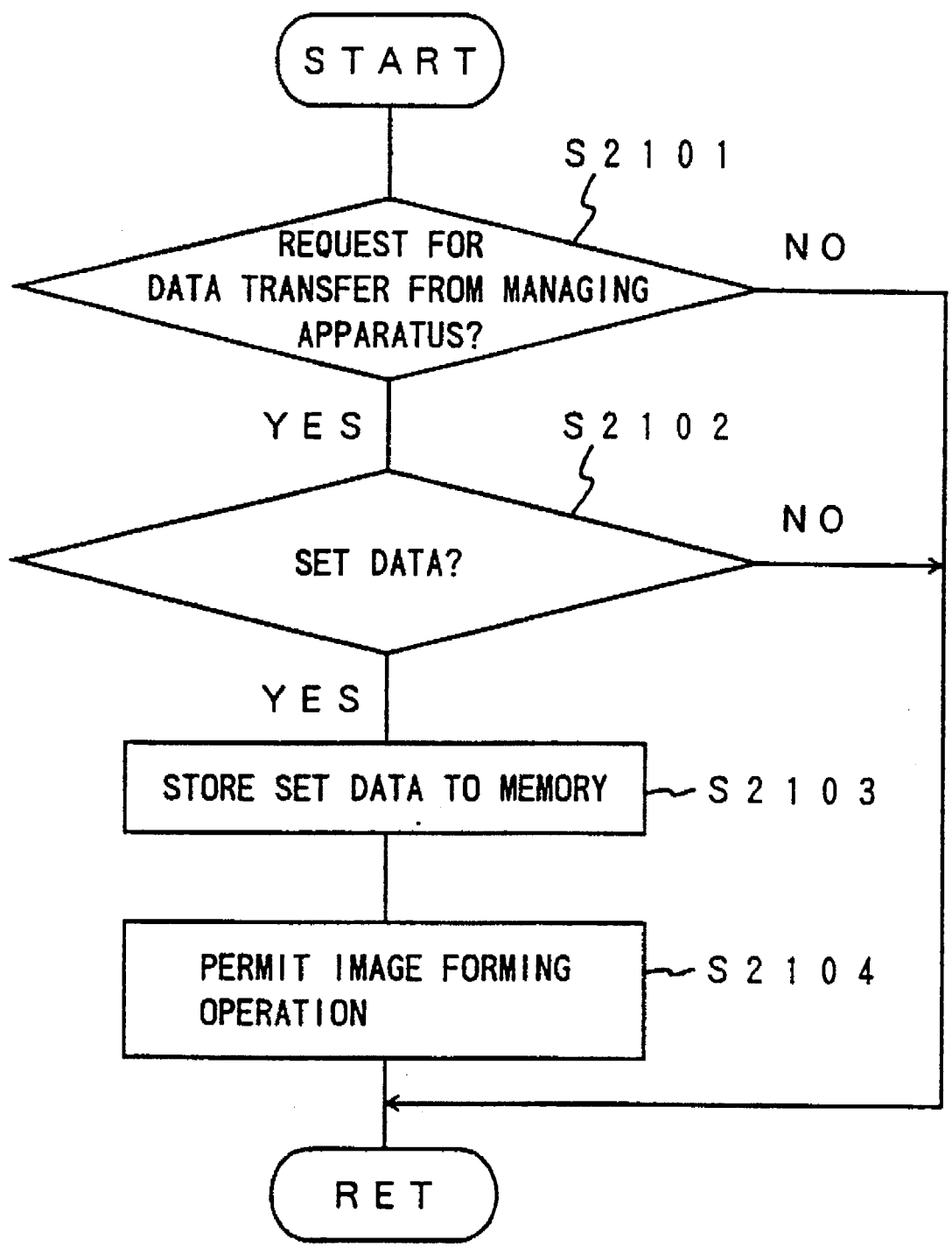
FIG. 24 is a flow chart of an operation of a managing system, according to the present invention, for image forming apparatuses.

FIGS. 23 and 24 show operations of the embodiment shown in FIG. 16A and 16B. It is determined, in S2001, whether or not an identification code is set. If it is determined that the identification code is set, it is determined, in S2002, whether or not the identification code is acceptable. That is, a determination is made in the image forming apparatus as to whether or not the identification code corresponds to one of preset identification codes. If it is determined that the identification code is acceptable, it is determined, in S2003, whether or not a communication can be performed with the managing apparatus 126. If it is determined that the communication can be performed, the identification code is transferred to the managing apparatus in S2004. If it is determined, in S2001, that the identification code is not set, if it is determined, in S2002, that the identification code is not acceptable, or if it is determined, in S2003, that a communication with the managing apparatus cannot be performed, the operation returns to the first step.

When the operation shown in FIG. 24 is started, it is determined, in S2101, whether a request for data transfer has been made by the managing apparatus 126. If it is determined that the request has been made, it is determined, in S2102, whether or not set data is present. The set data refers to data representing: necessity of activation of detecting means; selection of detecting means if there is a plurality of detecting means; a threshold value of the determining means; and setting of the image quality. If it is determined that the set data is present, the set data is stored, in S2103, to a memory, and then an image forming operation is allowed to be performed in S2104. If it is determined, in S2101, that the request has not been made by the managing apparatus, or if it is determined, in S2102, that the set data is not present, the operation returns to the first step.

Figure 25:
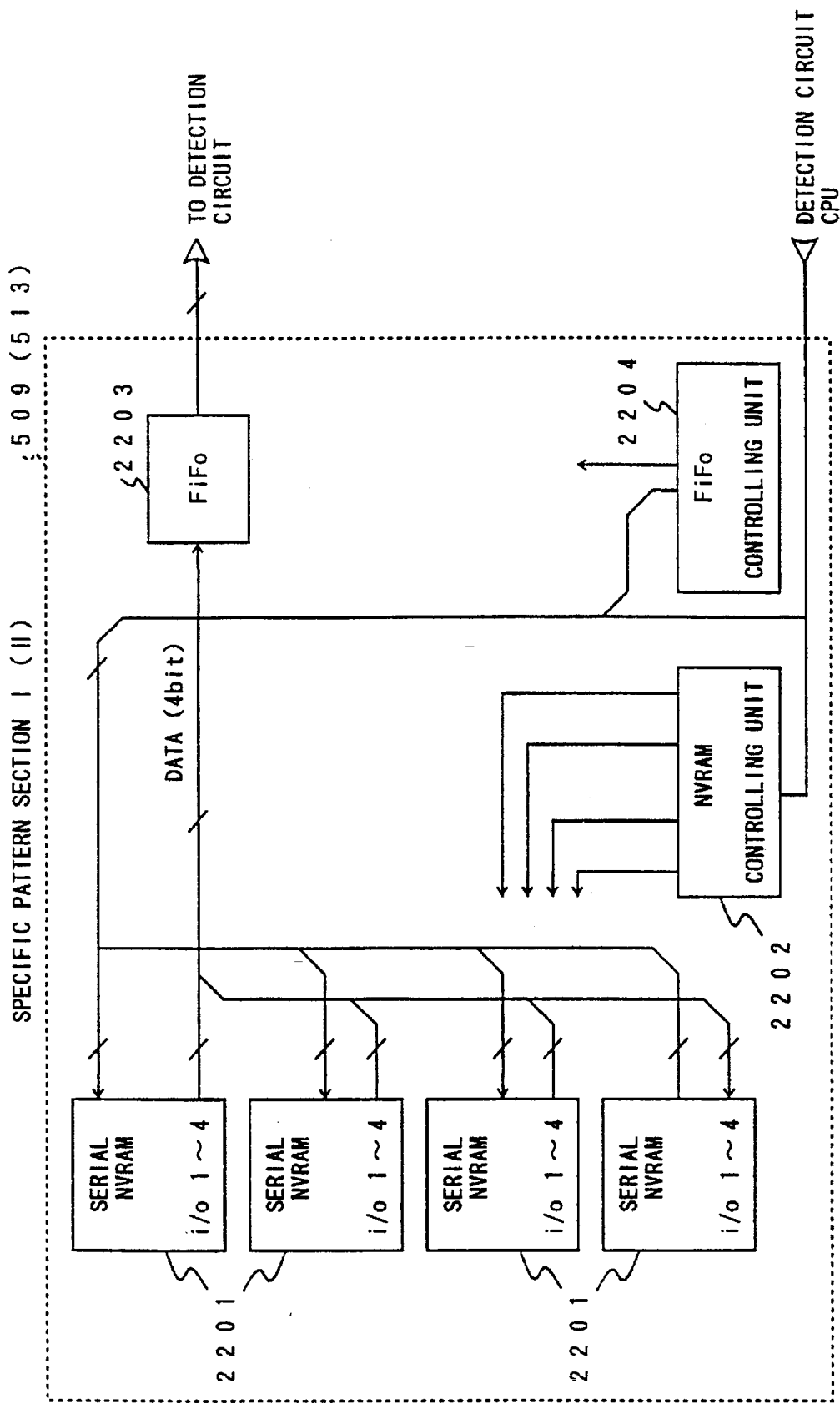
FIG. 25 is a block diagram showing a structure of a specific pattern section I and a specific pattern section II corresponding to the detecting circuit I and the detecting circuit II, respectively, shown in FIG. 8.

FIG. 25 is a block diagram of a structure of the specific pattern section I 509 and the specific pattern section II 513 corresponding to the detection circuit I and the detection circuit II, respectively. The specific pattern sections I or II comprise: a plurality of serial NVRAMs 2201; a NVRAM controlling unit 2202 for controlling the NVRAMs 2201; a FIFO memory 2203; and a FIFO controlling unit 2204 for controlling the FIFO memory 2203. The NVRAMs 2201 store pattern data transferred from the managing apparatus 126 to the PPC 120 via the communication controlling unit 121. The FIFO memory 2203 is provided to synchronize output timing of extracted pattern data and specific pattern data when performing an image forming operation. Each NVRAM 2201 comprises an EEPROM-SRAM pair. When the specific pattern data is rewritten in the NVRAM, serial data transferred via the NVRAM controlling unit 2202 is written in the EEPROM according to addresses therein. When the power is turned on, the pattern data is set in the SRAM (data in the EEPROM is read into the SRAM) by means of a recall command, and a synchronization is established between the detection circuit I 508 and the detection circuit II 513 by means of the FIFO memory 2203. Bit data required for the specific pattern sections I and II varies depending on documents (securities) to be discriminated.

Figure 26:
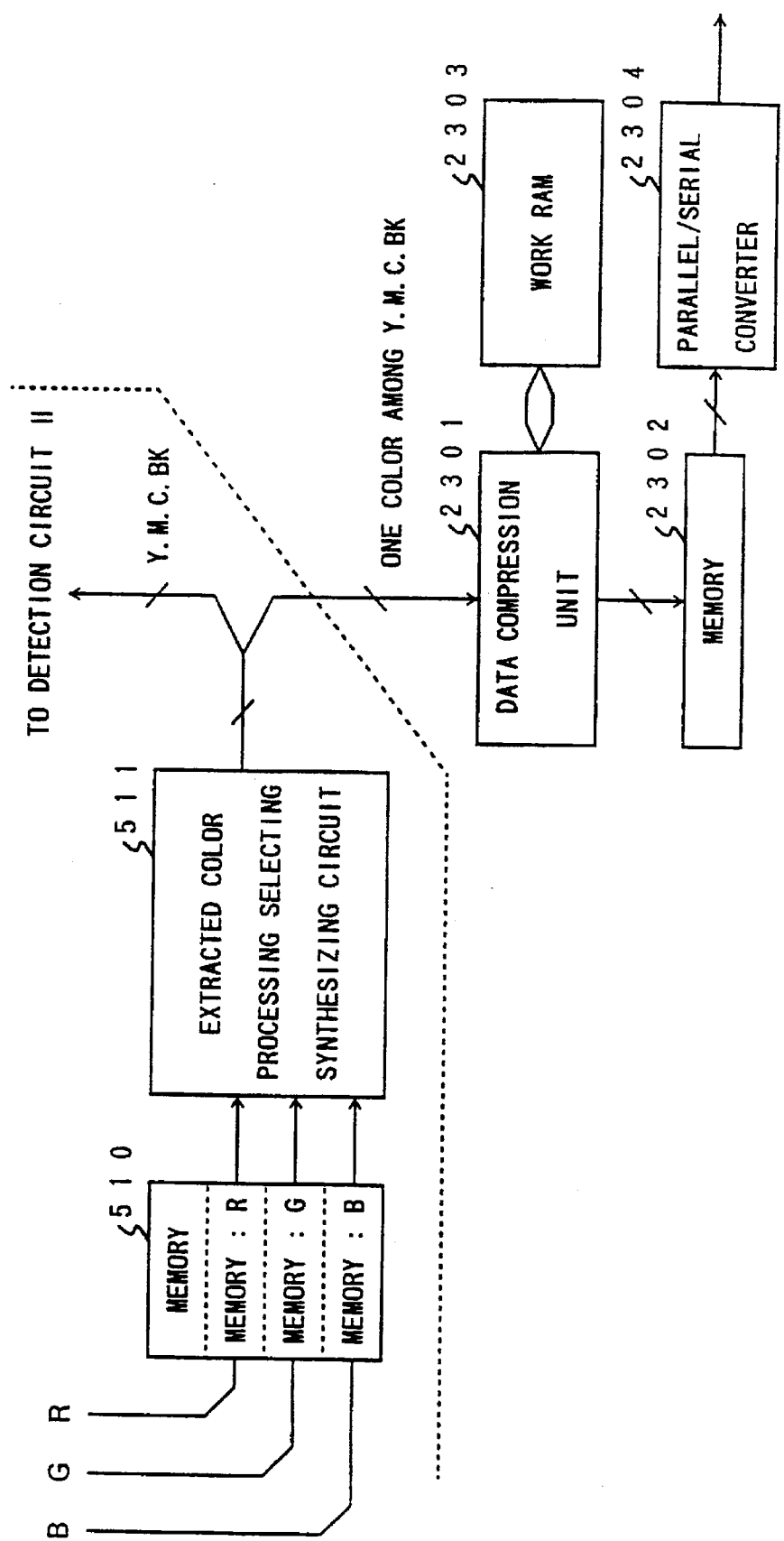
FIG. 26 is a block diagram showing a structure of a part which performs a data transfer to the managing apparatus.

FIG. 26 is a block diagram of a structure of a portion performing transfer of data to the managing unit 126. A data compression unit 2301 receives signals from the extracted color processing selecting synthesizing circuit 511, and compresses them. A memory 2302 stores output from the data compression unit 2301. A work RAM 2303 is connected to the data compression unit 2301. A parallel/serial converter 2304 converts output parallel data from the memory 2302 into serial data.

Figure 27:
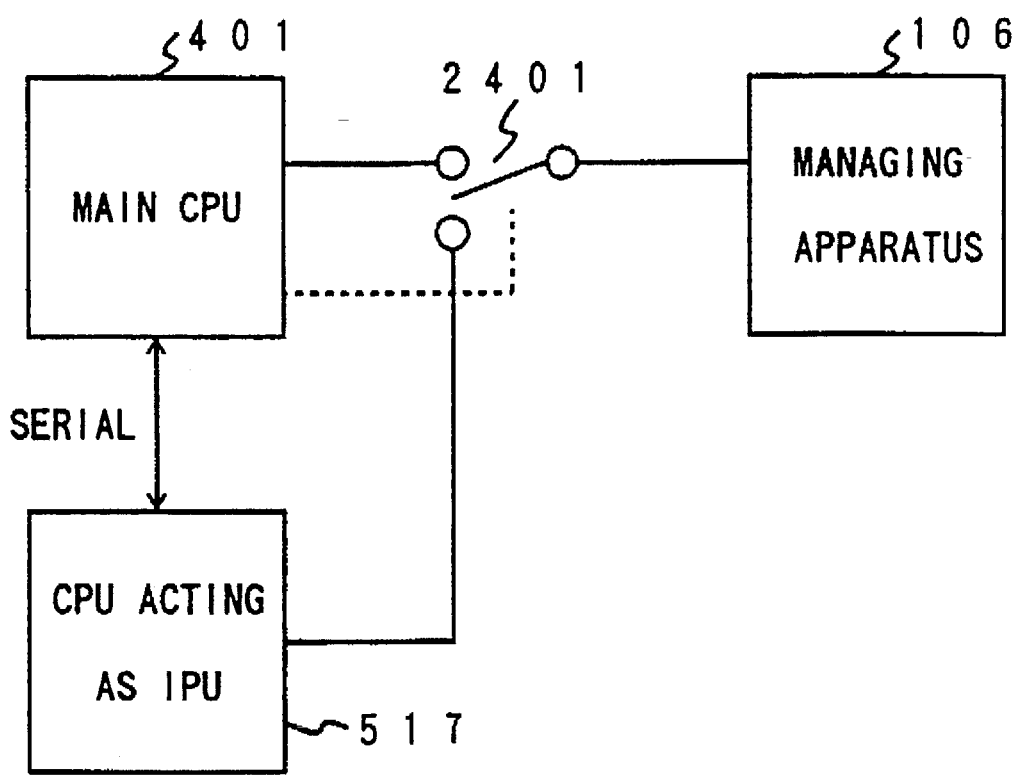
FIG. 27 is a block diagram showing a structure of a part which performs a data transfer to the managing apparatus in a managing system according to the present invention.

In the above-mentioned structure, when a specific pattern is recognized, single color data, that is, one among Y, M, C and BK, is sent to the data compression unit 2301 so that the single color data is compressed (binarized), which color data is synthesized from image data of R, G, B in the memory 510 by the extracted color processing selecting synthesizing circuit. The compressed data is stored in the memory 2302, and then output after being converted into serial data by the parallel/serial converter 2304. As shown in FIG. 27, in each of the above-mentioned embodiments, the main CPU 401 on the PPC 120 side performs a protocol arbitration for the communication for the image data and command data through a serial channel 2401.

Figure 28:
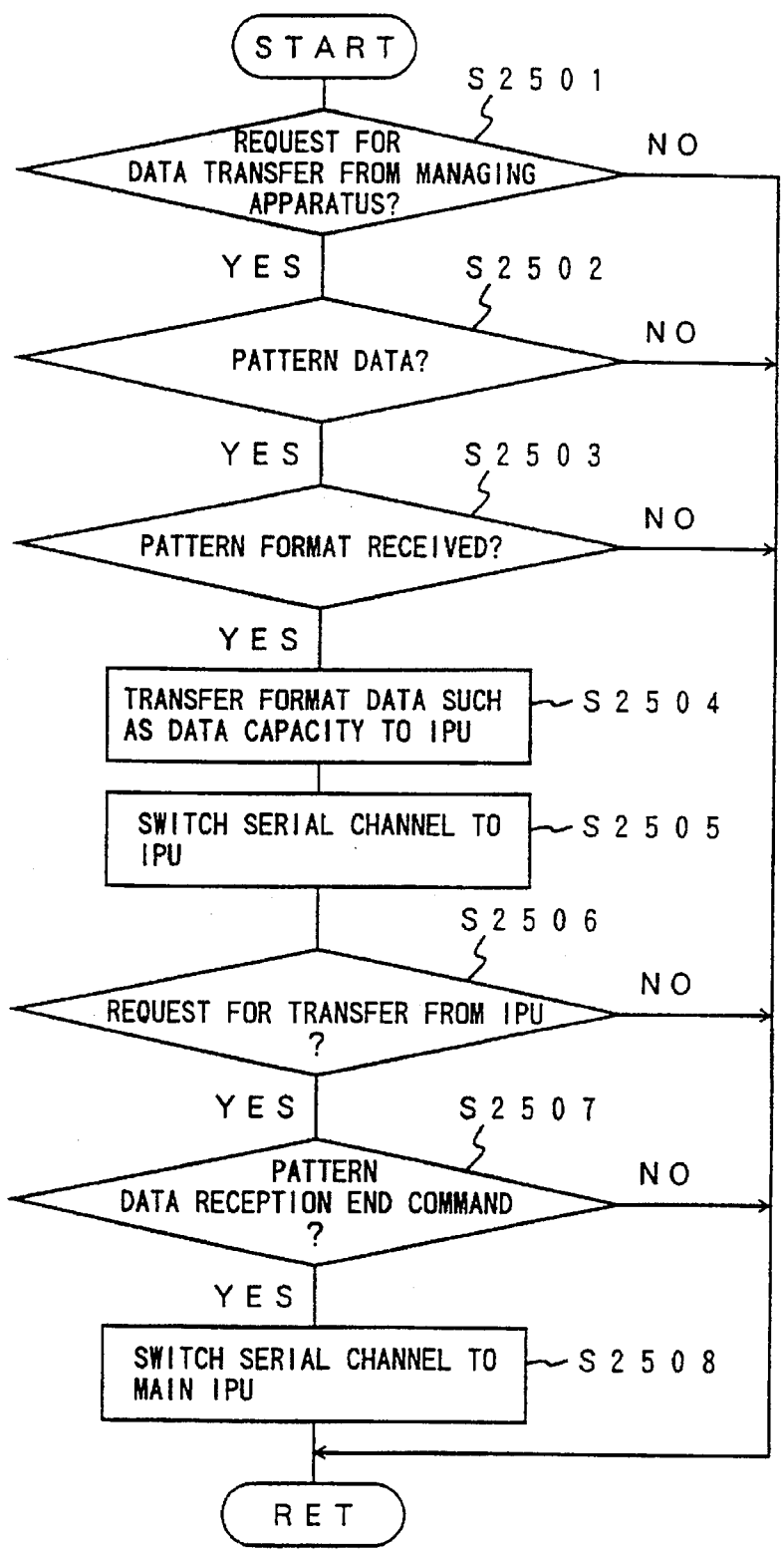
FIG. 28 is a flow chart of an operation of a managing system, according to the present invention, for image forming apparatuses.

FIG. 28 is a flow chart showing an operation for performing a protocol communication between the managing apparatus and the image forming apparatus. It is determined, in S2501, whether or not a request for data transfer has been made by the managing apparatus 126. If it is determined that the request has been made, it is determined, in S2502, whether or not pattern data is present. If it is determined that the pattern data is present, it is determined, in S2503, whether or not pattern format data has been received. If it is determined that the pattern format data has been received, format data indicating data capacity, for example, is transferred, in S2502, to the IPU. Thereafter, the serial channel 2401 is switched to the CPU 517 used as an IPU, and it is then determined, in S2506, whether or not a request for transfer has been made by the IPU. If it is determined that the request has been made, it is determined, in S2507, whether or not a pattern data reception end command is present. If it is determined that the command is present, the serial channel 2401 is switched, in S2508, to the main CPU 401.

Figure 29:
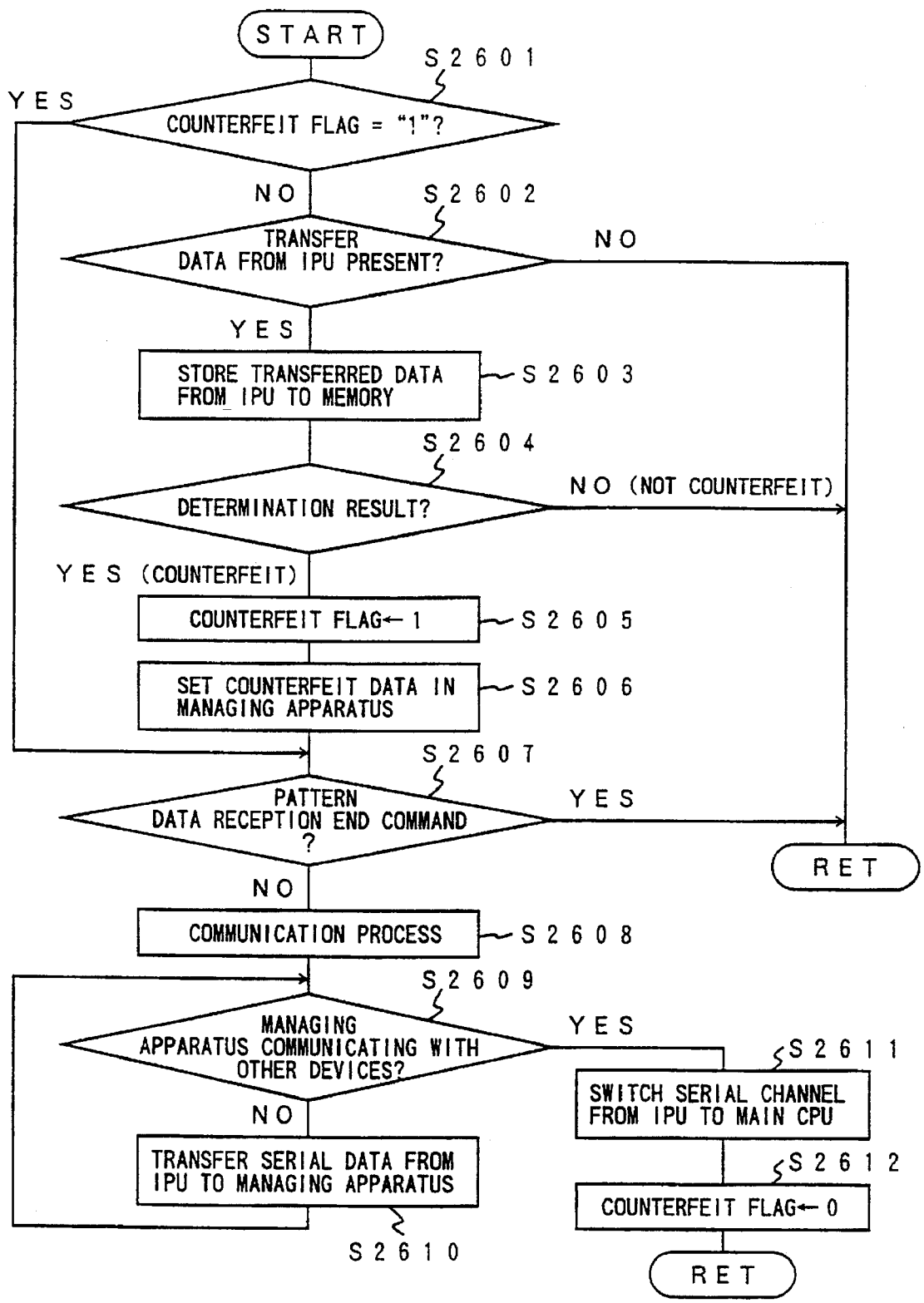
FIG. 29 is a flow chart of an operation of a managing system, according to the present invention, for image forming apparatuses.

FIG. 29 is a flow chart of an operation of determining of an unlawful copying operation to outputting of the result to the managing apparatus. When this operation is started, it is determined, in S2601, whether or not a counterfeit flag is set to "1". If it is determined that the counterfeit flag is not set to "1", it is determined, in S2602, whether or not transfer data from the IPU is present. If it is determined that the transfer data is present, the transfer data from the IPU is stored in a memory, and it is then determined, in S2604, whether or not the data indicates a counterfeit. If it is determined that the data indicates a counterfeit, the counterfeit flag is set, in S2605, to "1", and then the data is set, in S2606, in the managing apparatus 126. Thereafter, it is determined, in S2607, whether or not the managing apparatus 126 is communicating with other devices, that is, whether or not the managing apparatus 126 is in the "busy" state. If it is determined that the managing apparatus is not communicating with other devices, a communication process is performed in S2608. Thereafter, it is determined, in S2609, whether or not image data has been transferred. If it is determined that the image data has been transferred, serial data from the IPU is transferred to the managing apparatus 126. That is, single color data is compressed and output in serial form. On the other hand, if it is determined that the image data has already been transferred, the serial channel 2401 is switched, in S2611, from the CPU 517 used as an IPU to the main CPU 401. The counterfeit flag is then set, in S2612, to "0".

A description will now be given of a managing system in which prohibition of operation can be canceled by means of remote control when the image forming apparatus is in an inoperable state due to a reason such as that a counterfeit is detected. Due to canceling of prohibition of operation by means of remote control, it is not necessary for a technician to make a visit to a location where the image forming apparatus is installed so as to directly operate the image forming apparatus, and thus the operability is improved.

Figure 30:
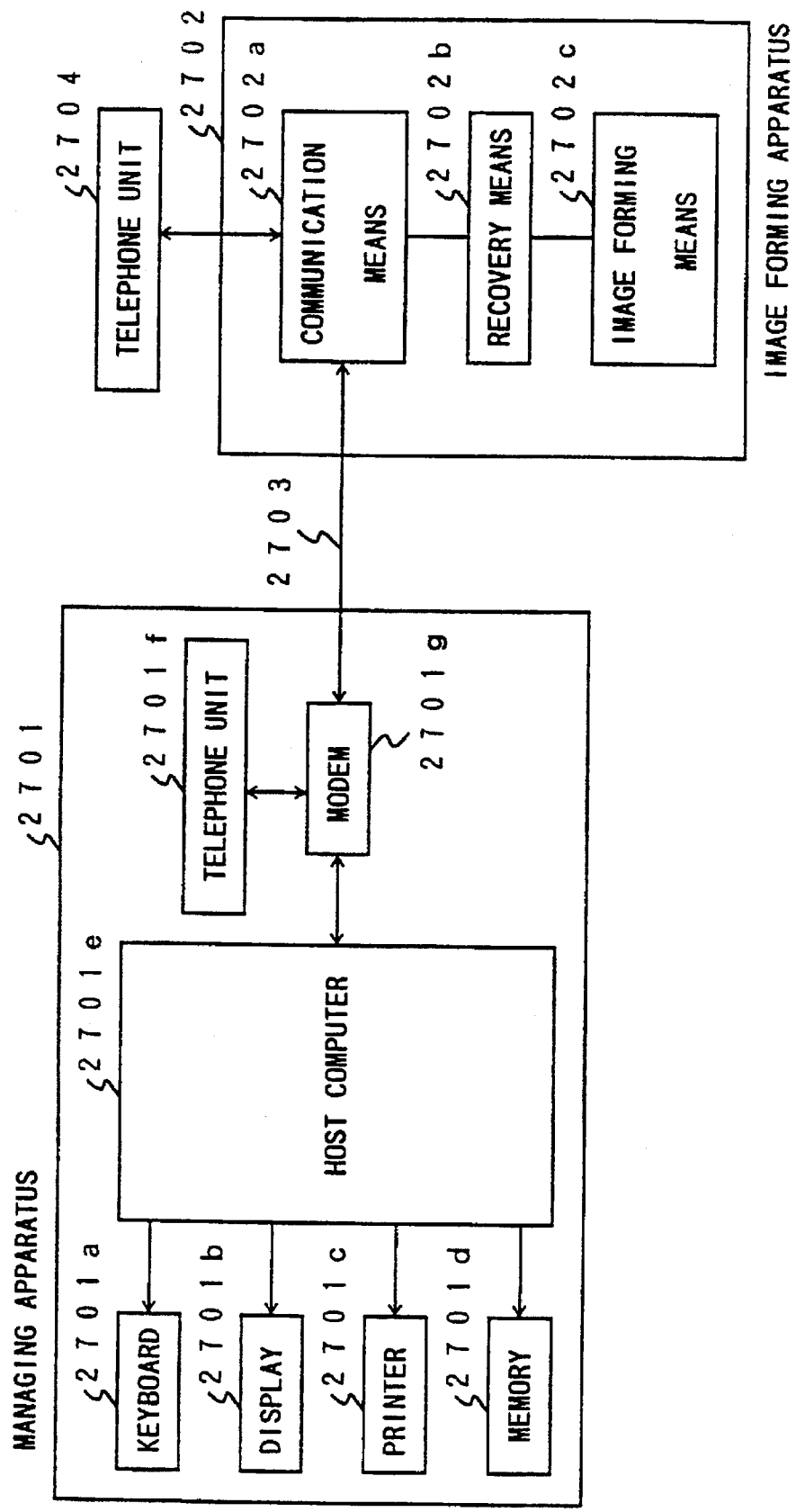
FIG. 30 is a block diagram of a structure of an embodiment of an image forming apparatus managing system according to the present invention in which embodiment a prohibition of operation can be withdrawn by means of remote control.

FIG. 30 is a block diagram showing a structure of the managing system. In the managing system, a managing apparatus 2701 comprises a keyboard 2701a, a display 2701b, a printer 2701c, a memory 2701d, a host computer 2701e, a telephone unit 2701f and a modem 2701g. An image forming apparatus 2702 comprises communication means 2702a, recovery means 2702b and image forming means 2702c. The modem 2701g of the managing apparatus 2701 is connected to the communication means 2702a via a telephone line 2703. The communication means of the image forming apparatus 2702 is also connected to a telephone unit 2704.

In the above-mentioned structure, it is assumed that the image forming unit 2702 failed in the image forming operating prohibition state, and it is desired to return to the operable state. In such a case, a signal for canceling prohibition of operation is input to the host computer using the keyboard 2701a of the managing apparatus 2701. The input signal is processed by the host computer so as to be a cancel signal, and output to the modem 2701g. The cancel signal is then sent from the modem 2701g to the communication means 2702a of the image forming apparatus 2702a via the telephone line. The cancel signal is input to the recovery means 2702b from the communication means 2701, and the recovery means cancels the image forming operation prohibition state of the image forming means 2702c.

Figure 31:
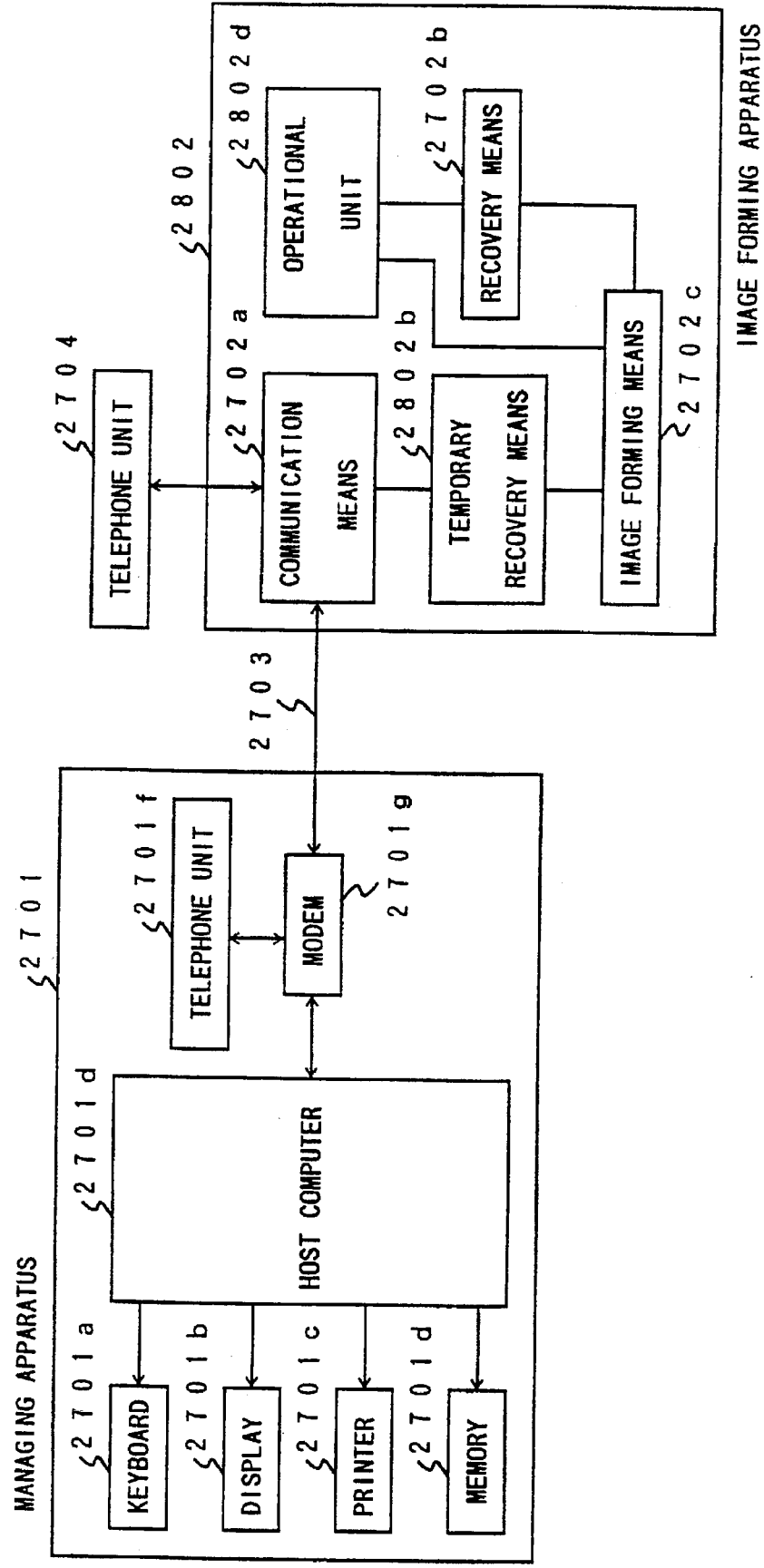
FIG. 31 is a block diagram showing a structure of an embodiment in which the image forming apparatus shown in FIG. 30 performs a temporary withdrawal of a prohibition of an operation.

FIG. 31 shows a structure in which the image forming apparatus 2702 of the above-mentioned system can temporarily cancel the prohibition of operation. An image forming apparatus has the same construction as that of the image forming apparatus 2702 except for an additional temporary recovery means 2802b and operational unit 2802d. Other component parts are the same as the parts shown in FIG. 30 and are given the same reference numerals as those shown in FIG. 30, and descriptions thereof will be omitted.

In the image forming apparatus 2802, when the cancel signal is sent to the communication means 2702a via the telephone line 2703, the cancel signal is input to the temporary recovery means 2702c. The temporary recovery means 2702c temporarily releases the image forming apparatus from the image forming operation prohibition state under a specific condition. Additionally, the image forming apparatus 2802d is provided with an operational unit 2802d, and the image forming apparatus is also released from the operation prohibition state by inputting the cancel signal to the recovery means 2701a via the operational unit 2802d.

The present invention is not limited to the specifically disclosed embodiments, and variations and modifications may be made without departing from the scope of the present invention.

We claim:

1. A special-document discriminating apparatus, connected to an image forming apparatus, which determines whether or not image data input from the image forming apparatus corresponds to a predetermined special-document, the special-document discriminating apparatus comprising:

storing means, detachably attached to a controlling circuit board such that the storing means can be independently detached from the controlling circuit board, for storing discriminating information used for determining whether or not the input image data corresponds to a special-document;

determining means for determining whether or not the input image data corresponds to the special-document in accordance with the discriminating information supplied by said storing means, and outputting the result of the determination to an external unit;

judging means for judging whether or not said storing means is attached to said controlling circuit board; and operation prohibiting means for outputting a signal used for prohibiting the operation of said image forming apparatus when said judging means judges that said storing means is not attached to the controlling circuit board, wherein said storing means is separated from said determining means provided on the controlling circuit board, and is replaced with another one so that only the discriminating information is changed to new discriminating information.

2. The special-document discriminating apparatus as claimed in claim 1, further comprising:

communication controlling means for receiving the discrimination information from an external unit via a communication line, and outputting the discriminating information to said storing means.

3. The special-document discriminating apparatus as claimed in claim 1, wherein said storing means is a ROM package attached to said controlling circuit board via a socket, and said judging means judges whether or not said ROM package is effectively attached to said socket.

4. The special-document discriminating apparatus as claimed in claim 1, further comprising new paper learning means for extracting the discrimination information of the special-document, when a predetermined signal is input, from the image data input from the image forming apparatus, and inputting the discrimination information to said storing means.

5. The special-document discriminating apparatus as claimed in claim 4, wherein an original used for generating image data, when said predetermined signal is input, is a test pattern having only features necessary for discriminating the special-document, and said new paper money learning means comprises test pattern learning means for extracting the discrimination information from the image data according to said test pattern.

* * * * *